United States Patent
Shotton et al.

(10) Patent No.: US 9,940,553 B2
(45) Date of Patent: Apr. 10, 2018

(54) CAMERA/OBJECT POSE FROM PREDICTED COORDINATES

(71) Applicant: MICROSOFT TECHNOLOGY LICENSING, LLC, Redmond, WA (US)

(72) Inventors: Jamie Daniel Joseph Shotton, Cambridge (GB); Benjamin Michael Glocker, Cambridge (GB); Christopher Zach, Cambridge (GB); Shahram Izadi, Cambridge (GB); Antonio Criminisi, Cambridge (GB); Andrew William Fitzgibbon, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 22 days.

(21) Appl. No.: 13/774,145

(22) Filed: Feb. 22, 2013

(65) Prior Publication Data

US 2014/0241617 A1     Aug. 28, 2014

(51) Int. Cl.
*G06K 9/00* (2006.01)
*G06K 9/62* (2006.01)
(Continued)

(52) U.S. Cl.
CPC ........... *G06K 9/66* (2013.01); *G06K 9/00671* (2013.01); *G06K 9/6219* (2013.01); *G06K 9/6256* (2013.01); *G06K 9/6282* (2013.01)

(58) Field of Classification Search
None
See application file for complete search history.

(56) References Cited

U.S. PATENT DOCUMENTS

| | | |
|---|---|---|
| 4,288,078 A | 9/1981 | Lugo |
| 4,627,620 A | 12/1986 | Yang |

(Continued)

FOREIGN PATENT DOCUMENTS

| | | |
|---|---|---|
| CN | 201254344 B | 6/2010 |
| CN | 102622762 A | 8/2012 |

(Continued)

OTHER PUBLICATIONS

Lepetit, Vincent, Pascal Lagger, and Pascal Fua. "Randomized trees for real-time keypoint recognition." Computer Vision and Pattern Recognition, 2005. CVPR 2005. IEEE Computer Society Conference on. vol. 2. IEEE, 2005.*

(Continued)

*Primary Examiner* — Sean Conner

(57) ABSTRACT

Camera or object pose calculation is described, for example, to relocalize a mobile camera (such as on a smart phone) in a known environment or to compute the pose of an object moving relative to a fixed camera. The pose information is useful for robotics, augmented reality, navigation and other applications. In various embodiments where camera pose is calculated, a trained machine learning system associates image elements from an image of a scene, with points in the scene's 3D world coordinate frame. In examples where the camera is fixed and the pose of an object is to be calculated, the trained machine learning system associates image elements from an image of the object with points in an object coordinate frame. In examples, the image elements may be noisy and incomplete and a pose inference engine calculates an accurate estimate of the pose.

20 Claims, 10 Drawing Sheets

(51) Int. Cl.
*G06K 9/36* (2006.01)
*G06K 9/66* (2006.01)

(56) References Cited

U.S. PATENT DOCUMENTS

| | | | |
|---|---|---|---|
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 6/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hollberg et al. | |
| 5,877,803 A | 3/1999 | Wee et al. | |
| 5,913,727 A | 6/1999 | Ahdoot | |
| 5,926,568 A | 7/1999 | Chaney et al. | |
| 5,930,392 A * | 7/1999 | Ho | 382/224 |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,009,359 A | 12/1999 | El-Hakim et al. | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,671,049 B1 * | 12/2003 | Silver | 356/401 |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,741,756 B1 * | 5/2004 | Toyama et al. | 382/291 |
| 6,765,726 B2 | 7/2004 | French et al. | |
| 6,781,618 B2 | 8/2004 | Beardsley | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 6,963,338 B1 * | 11/2005 | Bachelder et al. | 345/420 |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,167,578 B2 | 1/2007 | Blake et al. | |
| 7,170,492 B2 | 1/2007 | Bell | |
| 7,184,047 B1 * | 2/2007 | Crampton | G06T 17/00 345/473 |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |

(56) References Cited

U.S. PATENT DOCUMENTS

| | | | |
|---|---|---|---|
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,627,447 B2 | 12/2009 | Marsh et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| 7,860,301 B2 | 12/2010 | Se et al. | |
| RE42,256 E | 3/2011 | Edwards | |
| 7,898,522 B2 | 3/2011 | Hildreth et al. | |
| 7,925,081 B2 | 4/2011 | Gupta et al. | |
| 7,974,443 B2 | 7/2011 | Kipman et al. | |
| 8,009,880 B2 | 8/2011 | Zhang et al. | |
| 8,031,909 B2 | 10/2011 | Se et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,103,109 B2 | 1/2012 | Winn et al. | |
| 8,144,931 B1* | 3/2012 | Hartman et al. | 382/103 |
| 8,154,590 B2 | 4/2012 | Kressel et al. | |
| 2002/0069013 A1 | 6/2002 | Navab et al. | |
| 2004/0104935 A1 | 6/2004 | Williamson et al. | |
| 2005/0078178 A1* | 4/2005 | Brown et al. | 348/139 |
| 2007/0031001 A1* | 2/2007 | Hamanaka | 382/103 |
| 2007/0229498 A1 | 10/2007 | Matusik et al. | |
| 2008/0026838 A1 | 1/2008 | Dunstan et al. | |
| 2008/0137101 A1 | 6/2008 | Spence et al. | |
| 2008/0310757 A1 | 12/2008 | Wolberg et al. | |
| 2009/0033655 A1* | 2/2009 | Boca et al. | 345/419 |
| 2009/0034622 A1* | 2/2009 | Huchet | H04N 19/176 375/240.16 |
| 2009/0231425 A1 | 9/2009 | Zalewski | |
| 2010/0094460 A1 | 4/2010 | Choi et al. | |
| 2010/0111370 A1 | 5/2010 | Black et al. | |
| 2010/0295783 A1 | 11/2010 | El Dokor et al. | |
| 2010/0296724 A1 | 11/2010 | Chang et al. | |
| 2010/0302247 A1 | 12/2010 | Jerez et al. | |
| 2011/0210915 A1* | 9/2011 | Shotton et al. | 345/157 |
| 2011/0243386 A1* | 10/2011 | Sofka et al. | 382/103 |
| 2011/0267344 A1 | 11/2011 | Germann et al. | |
| 2012/0075343 A1 | 3/2012 | Chen et al. | |
| 2012/0120199 A1* | 5/2012 | Ben Himane | G06T 7/0046 348/46 |
| 2012/0147149 A1* | 6/2012 | Liu et al. | 348/50 |
| 2012/0147152 A1 | 6/2012 | Vogiatis et al. | |
| 2012/0148162 A1 | 6/2012 | Zhang et al. | |
| 2012/0163656 A1 | 6/2012 | Wang et al. | |
| 2012/0194516 A1* | 8/2012 | Newcombe et al. | 345/420 |
| 2012/0194517 A1 | 8/2012 | Izadi et al. | |
| 2012/0194644 A1* | 8/2012 | Newcombe et al. | 348/46 |
| 2012/0194650 A1 | 8/2012 | Izadi et al. | |
| 2012/0195471 A1 | 8/2012 | Newcombe et al. | |
| 2012/0196679 A1* | 8/2012 | Newcombe et al. | 463/36 |
| 2012/0212509 A1 | 8/2012 | Benko et al. | |
| 2012/0239174 A1 | 9/2012 | Shotton et al. | |
| 2013/0051626 A1* | 2/2013 | Abadpour | G06T 7/0083 382/106 |
| 2013/0251246 A1* | 9/2013 | Tang et al. | 382/159 |
| 2013/0265502 A1* | 10/2013 | Huebner | A63F 13/06 348/789 |
| 2014/0079314 A1* | 3/2014 | Yakubovich | G06K 9/6254 382/159 |
| 2015/0029222 A1* | 1/2015 | Hofmann | G06K 9/00993 345/633 |

FOREIGN PATENT DOCUMENTS

| | | |
|---|---|---|
| CN | 102622776 A | 8/2012 |
| EP | 0583061 A2 | 2/1994 |
| GB | 2411532 A | 8/2005 |
| JP | 08044490 A1 | 2/1996 |
| WO | 9310708 A1 | 6/1993 |
| WO | 9717598 A1 | 5/1997 |
| WO | 9944698 A1 | 9/1999 |

OTHER PUBLICATIONS

Dong, Zilong, et al. "Keyframe-based real-time camera tracking." Computer Vision, 2009 IEEE 12th International Conference on. IEEE, 2009.*

Liu, Ting, et al. "An investigation of practical approximate nearest neighbor algorithms." Advances in neural information processing systems. 2004.*

Lepetit, Vincent, and Pascal Fua. "Keypoint recognition using randomized trees." Pattern Analysis and Machine Intelligence, IEEE Transactions on 28.9 (2006): 1465-1479.*

Shotton, Jamie, et al. "Scene coordinate regression forests for camera relocalization in RGB-D images." Computer Vision and Pattern Recognition (CVPR), 2013 IEEE Conference on. IEEE, 2013.*

Wagner, Daniel, et al. "Pose tracking from natural features on mobile phones." Proceedings of the 7th IEEE/ACM International Symposium on Mixed and Augmented Reality. IEEE Computer Society, 2008.*

Castle, Robert O., et al. "Towards simultaneous recognition, localization and mapping for hand-held and wearable cameras." Robotics and Automation, 2007 IEEE International Conference on. IEEE, 2007.*

Castle, Robert, Georg Klein, and David W. Murray. "Video-rate localization in multiple maps for wearable augmented reality." Wearable Computers, 2008. ISWC 2008. 12th IEEE International Symposium on. IEEE, 2008.*

Fua, Pascal, and Vincent Lepetit. "Vision based 3D tracking and pose estimation for mixed reality." Emerging Technologies of Augmented Reality Interfaces and Design (2005): 43-63.*

Sequeira, Vitor, et al. "Automated reconstruction of 3D models from real environments." ISPRS Journal of Photogrammetry and Remote Sensing 54.1 (1999): 1-22.*

Hile, Harlan, and Gaetano Borriello. "Information overlay for camera phones in indoor environments." Location-and Context-Awareness. Springer Berlin Heidelberg, 2007. 68-84.*

Taylor, James, et al. "The vitruvian manifold: Inferring dense correspondences for one-shot human pose estimation." Computer Vision and Pattern Recognition (CVPR), 2012 IEEE Conference on. IEEE, 2012.*

Daniel, et al., "Pose Tracking from Natural Features on Mobile Phones", In IEEE/ACM International Symposium on Mixed and Augmented Reality, Sep. 15, 2008, pp. 125-134.

Breiman, Leo, "Random Forests", In Machine Learning, vol. 45, Issue 1, Oct. 2001, pp. 5-32.

Yeas, et al., "Creating Meaningful Environment Models for Augmented Reality", In IEEE Virtual Reality Conference, Mar. 8, 2008, pp. 295-296.

Ravi, Daniele, "Kinect: The Next Generation of Motion Control", Feb. 9, 2013, Available at: http://www.dmi.unict.it/~battiato/CVision1112/Kinect.pdf.

(56) References Cited

OTHER PUBLICATIONS

Sun, et al., "Conditional Regression Forests for Human Pose Estimation", In Proceedings of the 2012 IEEE Conference on Computer Vision and Pattern Recognition, Jun. 16, 2012, 8 pages.

Shotton, et al., "Efficient Human Pose Estimation from Single Depth Images", In IEEE Transactions on Pattern Analysis and Machine Intelligence, Jun. 21, 2011, 21 pages.

Fanelli, et al., "Real Time Head Pose Estimation with Random Regression Forests", In IEEE Conference on Computer Vision and Pattern Recognition, Jun. 20, 2011, 8 pages.

Bacon, Pierre-Luc, "Continous Head Pose Estimation using Random Regression Forests", Feb. 9, 2013, Available at: http://pierrelucbacon.com/assets/papers/rrfpose.pdf.

Gemme, et al., "Pose Refinement Using ICP Applied to 3-D LIDAR Data for Exploration Rovers", In Proceedings of International Symposium on Artificial Intelligence, Robotics and Automation in Space, Sep. 4, 2012, 8 pages.

Amit, et al., "Shape Quantization and Recognition with Randomized Trees", In Journal of Neural Computation, vol. 9, Issue 7, Oct. 1, 1997, 56 pages.

Baatz, et al., "Leveraging 3D City Models for Rotation Invariant Place-of-Interest Recognition", In International Journal of Computer Vision, vol. 96, Issue 3, May 27, 2011, 20 pages.

Besl, et al., "A Method for Registration of 3-D Shapes", In IEEE Transactions on Pattern Analysis and Machine Intelligence, vol. 14, Issue 2, Feb. 1992, 18 pages.

Calonder, et al., "BRIEF: Binary Robust Independent Elementary Features", In Proceedings of the 11th European Conference on Computer Vision: Part IV, Sep. 5, 2010, 14 pages.

Chum, et al., "Locally Optimized RANSAC", In Proceeding of 25th DAGM Symposium, Sep. 10, 2003, 8 pages.

Comaniciu, et al., "Mean Shift: A Robust Approach Toward Feature Space Analysis", In IEEE Transactions on Pattern Analysis and Machine Intelligence, vol. 24, Issue 5, May 2002, 17 pages.

Criminisi, et al., "Decision Forests: A Unified Framework for Classification, Regression, Density Estimation, Manifold Learning and Semi-Supervised Learning", In Journal of Foundations and Trends in Computer Graphics and Vision, vol. 7, Issue 2-3, Feb. 2012, 150 pages.

Dong, et al., "Keyframe-Based Real-Time Camera Tracking", In IEEE 12th International Conference on Computer Vision, Sep. 29, 2009, 8 pages.

Eade, et al., "Unified Loop Closing and Recovery for Real Time Monocular SLAM", In Proceeding of 19th British Conference on Machine Vision, Sep. 1, 2008, 10 pages.

Gall, et al., "Hough Forests for Object Detection, Tracking, and Action Recognition", In IEEE Transactions on Pattern Analysis and Machine Intelligence, vol. 33, Issue 11, Nov. 2011, 15 pages.

Gee, et al., "6D Relocalisation for RGBD Cameras Using Synthetic View Regression", In Proceeding of British Machine Vision Conference, Sep. 3, 2012, 11 pages.

Holzer, et al., "Learning to Efficiently Detect Repeatable Interest Points in Depth Data", In Proceedings of the 12th European Conference on Computer Vision, vol. Part I, Oct. 7, 2012, 14 pages.

Irschara, et al., "From Structure-from-Motion Point Clouds to Fast Location Recognition", In Proceeding of IEEE Conference on Computer Vision and Pattern Recognition, Jun. 20, 2009, 8 pages.

Izadi, et al., "KinectFusion: Real-time 3D Reconstruction and Interaction Using a Moving Depth Camera", In Proceedings of the 24th Annual ACM Symposium on User Interface Software and Technology, Oct. 16, 2011, 10 pages.

Klein, et al., "Improving the Agility of Keyframe-Based SLAM", In Proceedings of the 10th European Conference on Computer Vision, Oct. 12, 2008, 14 pages.

Lepetit, et al., "Keypoint Recognition Using Randomized Trees", In IEEE Transactions on Pattern Analysis and Machine Intelligence, vol. 28, Issue 9, Sep. 2006, 15 pages.

Li, et al., "Location Recognition using Prioritized Feature Matching", In Proceedings of the 11th European Conference on Computer Vision, Sep. 5, 2010, 14 pages.

Montillo, et al., "Age Regression from Faces Using Random Forests", In Proceedings of the 16th IEEE International Conference on Image Processing, Nov. 7, 2009, 4 pages.

Newcombe, et al., "DTAM: Dense Tracking and Mapping In Real-Time", In Proceedings of International Conference on Computer Vision, Nov. 6, 2011, 8 pages.

Ni, et al., "Epitomic Location Recognition", In Proceeding of IEEE Conference on Computer Vision and Pattern Recognition, Jun. 23, 2008, 8 pages.

Nister, David, "Preemptive RANSAC for Live Structure and Motion Estimation", In Proceedings of the Ninth IEEE International Conference on Computer Vision, Oct. 13, 2003, 8 pages.

Nister, et al., "Scalable Recognition with a Vocabulary Tree", In Proceedings of the IEEE Computer Society Conference on Computer Vision and Pattern Recognition, Jun. 17, 2006, 8 pages.

Rosten, et al., "Faster and Better: A Machine Learning Approach to Corner Detection", In IEEE Transactions on Pattern Analysis and Machine Intelligence, vol. 32, Issue 1, Jan. 2010, 15 pages.

Rublee, et al., "ORB: An Efficient Alternative to SIFT or SURF", In Proceeding of IEEE International Conference on Computer Vision, Nov. 6, 2011, 8 pages.

Sattler, et al., "Fast Image-Based Localization Using Direct 2D-to-3D Matching", In Proceeding of International Conference on Computer Vision, Nov. 6, 2011, 8 pages.

Schindler, et al., "City-Scale Location Recognition", In Proceeding of IEEE Computer Society Conference on Computer Vision and Pattern Recognition, Jun. 18, 2007, 7 pages.

Se, et al., "Vision-Based Global Localization and Mapping for Mobile Robots", In Journal of IEEE Transaction on Robotics, vol. 21, Issue 3, Jun. 2005, 12 pages.

Shotton, et al., "Real-Time Human Pose Recognition in Parts from Single Depth Images", In Proceedings of the IEEE Conference on Computer Vision and Pattern Recognition, Jun. 21, 2011, 8 pages.

Taylor, et al., "The Vitruvian Manifold: Inferring Dense Correspondences for One-shot Human Pose Estimation", In Proceedings of the IEEE Conference on Computer Vision and Pattern Recognition, Jun. 16, 2012, 8 pages.

Williams, et al., "Automatic Relocalization and Loop Closing for Real-Time Monocular SLAM", In IEEE Transactions on Pattern Analysis and Machine Intelligence, vol. 33, Issue 9, Sep. 2011, 14 pages.

Winder, et al., "Learning Local Image Descriptors", In Proceedings of the IEEE Conference on Computer Vision and Pattern Recognition, Jul. 17, 2007, 8 pages.

Wu, et al., "3D Model Matching with Viewpoint-Invariant Patches (VIP)", In Proceedings of the IEEE Conference on Computer Vision and Pattern Recognition, Jun. 23, 2008, 8 pages.

"Kabsch algorithm" Three pages downloaded from en.wikipedia.org/wiki/kabsch_algorithm on May 16, 2013.

U.S. Appl. No. 13/749,497 "Camera pose estimation for 3D reconstruction", filed Jan. 24, 2013, Sharp et al.

U.S. Appl. No. 13/300,542 "Computing pose and/or shape of modifiable entities" Shotton et al., filed Nov. 18, 2011.

Higo, et al., "A Hand-held Photometric Stereo Camera for 3-D Modeling", In International Conference on Computer Vision, Sep. 29, 2009, pp. 1234-1241.

Anderson, et al., "Augmenting Depth Camera Output Using Photometric Stereo", In Conference on Machine Vision Applications, Jun. 13, 2011, pp. 369-372.

Celix, et al., "Monocular Vision SLAM for Indoor Aerial Vehicles", In Proceedings of the IEEE/RSJ Inter-national conference on Intelligent Robots and Systems, Oct. 11, 2009, 8 pages.

Gemeiner, et al., "Improving Localization Robustness in Monocular SLAM Using a High-Speed Camera", In Proceedings of Robotics: Science and Systems, Jun. 25, 2008, 8 pages.

Mair, et al., "Efficient Camera-Based Pose Estimation for Real-Time Applications", In Proceedings of International Conference on Intelligent Robots and Systems,Oct. 11, 2009, 8 pages.

Debevec, et al., "Acquiring the Reflectance Field of a Human Face", Published on: Apr. 4, 2004, 5 pages. Available at: http://www.pauldebevec.com/Research/LS/.

(56) References Cited

OTHER PUBLICATIONS

Einarsson, et al.,"Relighting Human Locomotion with Flowed Reflectance Fields", Retrieved on: Oct. 10, 2012, 2 pages. Available at: http://gl.ict.usc.edu/Research/RHL/.

Granieri et al.,"Simulating Humans in VR", The British Computer Society, Oct. 1994, 15 pages, Academic Press.

"Second Written Opinion Issued in PCT Application No. PCT/US2014/012226", dated Apr. 7, 2015, 5 pages.

"International Preliminary Report on Patentability Issued in PCT Application No. PCT/US2014/012226", dated Jul. 9, 2015, 6 pages.

Levoy et al.,The digital Michelangelo Project: 3D scanning of large statues, ACM Transactions on Graphics (SIGGRAPH), 2000, 14 pages.

Lorensen et al., Marching cubes: A high resolution 3D surface construction algorithm, ACM Transactions on Graphics (SIGGRAPH), 1987, 7 pages.

Newcombe et al., Live dense re-construction with a single moving camera, Proceedings of the IEEE Conference on Computer Vision and Pattern Recognition (CVPR), 2010, 8 pages.

Nguyen, GPU Gems 3, Addison-Wesley Professional, 2007, 4 pages Located at: http://http. developer.nvidia.com/GPUGems3/gpugems3_pref01.html.

Osher et al., Level Set Methods and Dynamic Implicit Surfaces, 2002, 288 pages, Springer.

Parker et al., Interactive ray tracing for isosurface rendering, Proceedings of Visualization, 1998, 7 pages.

Pollefeys et al., Detailed real-time urban 3D reconstruction from video, International Journal of Computer Vision (IJCV), 2008, 78, 2-3, pp. 143-167.

Purcell et al., Ray tracing on programmable graphics hardware, ACM SIGGRAPH Courses, 2005, 10 pages.

Seitz et al., A comparison and evaluation of multiview stereo reconstruction algorithms, Proceedings of the IEEE Conference on Computer Vision and Pattern Recognition (CVPR), 2006, 8 pages.

Stuhmer et al., Real-time dense geometry from a handheld camera, Proceedings of the DAGM Symposium on Pattern Recognition, 2010, 10 pages.

Vogiatzis et al., Reconstructing relief surfaces, Image and Vision Computing (IVG), 2008, 26, 3, pp. 397-404.

Zach et al., A globally optimal algorithm for robust TV-L 1 range image integration. In Proceedings of the International Conference on Computer Vision (ICCV), 2007, 8 pages.

Zhou et al., Data-parallel octrees for surface reconstruction, IEEE Transactions on Visualization and Computer Graphics, 2011, 13 pages.

Stein et al., Structural Indexing: Efficient 3-D Object Recognition, IEEE Transactions on Pattern Analysis and Machine Intelligence, Feb. 1992, 21 pages, vol. 14, No. 2.

Blog: Matt Cutts: Gadgets, Google, and SEO, Apr. 9, 2010, 35 pages.

"Channel Access Method", Oct. 26, 2011, 7 pages. Located at: http://en.wikipedia.org/wiki/Multiple_access_protocol#Circuit_mode_and_channelization_methods.

Rusinkiewicz et al., Efficient Variants of the ICP Algorithm, Stanford University, Efficient Variants of the ICP Algorithm, 2001, 8 pages. Located at: http://www.cs.princeton.edu/-smr/papers/fasticp/fasticp_paper.pdf.

Krainin et al., ICRA 2010 Workshop paper: "Manipulator and Object Tracking for In Hand Model Acquisition" 34 pages, 2010. Located at: http://ils.intel-research.nel/publications.

Henry et al., RGB-D mapping: Using depth cameras for dense 3D modeling of indoor environments, Proceedings of the International Symposium on Experimental Robotics (ISER), 2010, 15 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, 13 pages, University of Texas at Austin, Austin, TX.

Shao et al., "An Open System Architecture for a Multimedia and Multimodal User Interface", Aug. 24, 1998, 8 pages, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, 35 pages, Germany.

Hasegawa et al., "Human-Scale Haptic Interaction with a Reactive Virtual Human in a Real-Time Physics Simulator", Jul. 2006, 12 pages, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, 121 pages,The Robotics Institute, Carnegie Mellon University, Pittsburgh, PA.

He, "Generation of Human Body Models", Apr. 2005, 111 pages, University of Auckland, New Zealand.

Isard et al., "CONDENSATION—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, 145 pages, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, 22 pages, European Computer-Industry Research Center GmbH, Munich, Germany.

Freeman et al., "Television Control by Hand Gestures", Dec. 1994, 7 pages, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, pp. 602-605, vol. 15, No. 6, IEEE Transactions on Pattern Analysis and Machine Intelligence.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, 11 pages, Chapel Hill, NC.

Stevens, "Flights into Virtual Reality Treating Real World Disorders", The Washington Post, Mar. 27, 1995, Science Psychology, 3 pages.

"International Search Report", dated Aug. 28, 2012, Application No. PCT/US2012/020681, Filed Date—Jan. 9, 2012, 8 pages.

(56) References Cited

OTHER PUBLICATIONS

"International Search Report", dated Aug. 30, 2012, Application No. PCT/US2012/020687, Filed Date: Jan. 9, 2012, 8 pages.
Andrew et al., "KinectFusion Real-time Dense Surface Mapping and Tracking", In Proceedings of 1oth IEEE International Symposium on Mixed and Augmented Reality, Oct. 29, 2011, 11 pages.
Whelan et al., "Robust Tracking for Real-Time Dense RGB-D Mapping with Kintinuous", In technical report of MIT, Sep. 17, 2012, 10 pages.
Lysenkov et al., "Recognition and Pose Estimation of Rigid Transparent Objects with a Kinect Sensor", In Proceedings of Conference on Robotics: Science and Systems, Jul. 13, 2012, 8 pages.
Chiu et al.,"Improving the Kinect by Cross-Modal Stereo" In Proceedings of 22nd British Machine Vision Conference, Aug. 2011, 10 pages.
Baak et al., "A Data-Driven Approach for Real-Time Full Body Pose Reconstruction from a Depth Camera" In IEEE International Conference on Computer Vision, 2011, Nov. 13, 2011, 8 pages.
Knoop et al., "Sensor Fusion for 3D Human Body Tracking with an Articulated 3D Body Model", In Proceedings of the IEEE International Conference on Robotics and Automation, May 19, 2006, 6 pages.
Tykkala et al., "Direct Iterative Closest Point for Real-Time Visual Odometry", In Proceedings of the IEEE International Conference on Computer Vision Workshops, Nov. 13, 2011, 7 pages.
Fitzgibbon, "Robust Registration of 2D and 3D Point Sets", In Proceedings of Image and Vision Computing, 2003, Dec. 1, 2003, 10 pages.
Blais, Registering multiview range data to create 3D computer objects. IEEE Transactions on Pattern Analysis and Machine Intelligence (PAMI), 1995, 17, 8, pp. 820-824.
Campbell et al., Automatic 3D object segmentation in multiple views using volumetric graph-cuts, Image and Vision Computing (IVC), 2010, 10 pages.
Chen et al., Object modeling by registration of multiple range images, Proceedings of the 1991 IEEE, Apr. 1991, 6 pages.
Cohen et al., Interactive fluid-particle simulation using translating Eulerian grids, Proceedings of the SIGGRAPH symposium on Interactive 3D Graphics and Games, 2010, 8 pages.
Curless et al., A volumetric method for building complex models from range images, ACM Transactions on Graphics (SIGGRAPH), 1996, 10 pages.
Davison et al.,Mobile robot localisation using active vision, In Proceedings of the European Conference on Computer Vision (ECCV), 1998, 17 pages.
Elfes et al.,Sensor integration for robot navigation: combining sonar and range data in a grid-based representation, In Proceedings of the IEEE Conference on Decision and Control, 1987, 8 pages.
Frahm et al., Building Rome on a cloudless day, In Proceedings of the European Conference on Computer Vision (ECCV), 2010, 14 pages.
Furukawa et al., Towards internet-scale multi-view stereo, In Proceedings of the IEEE Conference on Computer Vision and Pattern Recognition (CVPR), 2010, 8 pages.
Goesele et al., Multiview stereo revisited, In Proceedings of the IEEE Conference on Computer Vision and Pattern Recognition (CVPR), 2006, 8 pages.
Grand, Chapter 32. Broad-phase collision detection with CUDA, GPU Gems 3, Addison-Wesley Professional, 2007, 26 pages.
Hadwiger et al., Advanced illumination techniques for GPU volume raycasting, ACM SIGGRAPH Asia Courses, 2008, 166 pages.
Klein et al.,Parallel tracking and mapping for small AR workspaces, Proceedings of the International Symposium on Mixed and Augmented Reality (ISMAR), 2007, 10 pages.
Rusinkiewicz et al., Real-time 3D model acquisition, ACM Transactions on Graphics (SIGGRAPH), 2002, 9 pages.
Thrun et al., Probabilistic Robotics. Cambridge: MIT Press, 2005, 2 pages.
Wurm et al., OctoMap: A probabilistic, flexible, and compact 3D map representation for robotic systems, In Proceedings of the ICRA 2010 Workshop on Best Practice in 3D Perception and Modeling for Mobile Manipulation, 2010, 8 pages.
Lai et al., Sparse Distance Learning for Object Recognition Combining RGB and Depth Information 7 pages, http:/ils.intel-research.nel/publications/47, 2011.
Harada, Chapter 29. Real-time rigid body simulation on gpus. In GPU Gems 3, 2007, 25 pages, Addison-Wesley Professional.
Henry, et al., RGB-D mapping: Using depth cameras for dense 3D modeling of indoor environments, In Proceedings of the International Symposium on Experimental Robotics (ISER), 2010, 2 pages.
"International Search Report & Written Opinion for PCT Patent Application No. PCT/US2013/077736", dated Mar. 27, 2014, Filed Date: Dec. 26, 2013, 15 Pages.
"International Search Report & Written Opinion for PCT Patent Application No. PCT/US2014/016749", dated May 12, 2014, Filed Date: Feb. 18, 2014, 8 Pages.
"International Search Report & Written Opinion for PCT Patent Application No. PCT/US2014/012226", dated May 12, 2014, Filed Date: Jan. 21, 2014, 8 Pages.
"MapReduce", Wikipedia, Jan. 11, 2012, 5 pages. Located at: http://web.archive.org/web/20120111070052/http://en.wikipedia.org/wiki/MapReduce.
"Signed distance function", Wikipedia, Jan. 20, 2012, 1 page. Located at: http://web.archive.org/web/20120120095205/http://en.wikipedia.org/wiki/Signed_distance_function.
Notice of Allowance, U.S. Appl. No. 13/749,497, dated Sep. 21, 2015, 8 pages.
Office Action Summary, U.S. Appl. No. 13/749,497, dated Mar. 5, 2015, 14 pages.
Office Action Summary, U.S. Appl. No. 13/749,497, dated Nov. 10, 2014, 14 pages.
Office Action Summary, U.S. Appl. No. 13/749,497, dated Jun. 10, 2014, 15 pages.
Sminchisescu, et al., "Human Pose Estimation from Silhouettes a Consistent Approach using Distance Level Sets", In Proceedings of WSCG International Conference on Computer Graphics, Visualization and Computer Vision, 2002, pp. 413-420.
Wuhrer, et al., "Human Shape Correspondence with Automatically Predicted Landmarks", In Journal of Machine Vision and Applications, vol. 22, Aug. 6, 2011, pp. 1-9.
Agarwal, et al., "3D Human Pose from Silhouettes by Relevance Vector Regression", In Proceedings of IEEE Computer Society Conference on Computer Vision and Pattern Recognition, vol. 2, Jun. 27-Jul. 2, 2004, pp. 882-888.
Elgammal, et al., "Inferring 3D Body Pose from Silhouettes using Activity Manifold Learning", In Proceedings of IEEE Computer Society Conference on Computer Vision and Pattern Recognition, vol. 2, Jun. 27-Jul. 2, 2004, pp. 681-688.
Ballan, et al., "Marker-less motion capture of skinned models in a four camera set-up using optical flow and silhouettes", 3DPVT, Atlanta, GA, USA, 2008, 8 pages.
Lu, et al., "Multi-view human motion capture with an improved deformation skin model", Digital Image Computing: Techniques and Applications 2008, 8 pages, doi: 10.1109/DICTA.2008.14.
Magnenat-Thalmann et al., "Joint-dependent local deformations for hand animation and object grasping", In Proceedings on Graphics interface 1988, 12 pages, Canadian Information Processing Society.
Kurihara, "Modeling deformable human hands from medical images", 9 pages, 2004, Proceedings of the 2004 ACM SIGGRAPH.
Notice of Allowance, U.S. Appl. No. 13/300,542, dated Dec. 23, 2013, 6 pages.
Office Action Summary, U.S. Appl. No. 13/300,542, dated Sep. 4, 2013, 10 pages.
"Office Action Issued in European Patent Application No. 14709030.2", dated Feb. 24, 2017, 6 Pages.
"Office Action Issued in European Patent Application No. 14709030.2", dated Sep. 29, 2017, 5 Pages.
"First Office Action and Search Roport issued in Chinese patent Application No. 201480010236.1", dated Jan. 19, 2018, 14 Pages.

* cited by examiner

CAMERA/OBJECT POSE FROM PREDICTED COORDINATES

BACKGROUND

For many applications, such as robotics, vehicle navigation, computer game applications, medical applications and other problem domains, it is valuable to be able to find orientation and position of a camera as it moves in a known environment. Orientation and position of a camera is known as camera pose and may comprise six degrees of freedom (three of translation and three of rotation). Where a camera is fixed and an object moves relative to the camera it is also useful to be able to compute the pose of the object.

A previous approach uses keyframe matching where a whole test image is matched against exemplar training images (keyframes). K matching keyframes are found, and the poses (keyposes) of those keyframes are interpolated to generate an output camera pose. Keyframe matching tends to be very approximate in the pose result.

Another previous approach uses keypoint matching where a sparse set of interest points are detected in a test image and matched using keypoint descriptors to a known database of descriptors. Given a putative set of matches, a robust optimization is run to find the camera pose for which the largest number of those matches are consistent geometrically. Keypoint matching struggles in situations where too few keypoints are detected.

Existing approaches are limited in accuracy, robustness and speed.

The embodiments described below are not limited to implementations which solve any or all of the disadvantages of known systems for finding camera or object pose.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Camera or object pose calculation is described, for example, to relocalize a mobile camera (such as on a smart phone) in a known environment or to compute the pose of an object moving relative to a fixed camera. The pose information is useful for robotics, augmented reality, navigation and other applications. In various embodiments where camera pose is calculated, a trained machine learning system associates image elements from an image of a scene, with points in the scene's 3D world coordinate frame. In examples where the camera is fixed and the pose of an object is to be calculated, the trained machine learning system associates image elements from an image of the object with points in an object coordinate frame. In examples, the image elements may be noisy and incomplete and a pose inference engine calculates an accurate estimate of the pose.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented using a random decision forest, the system described is provided as an example and not a limitation. As those skilled in the art will appreciate, the present examples may be implemented using a variety of different types of machine learning systems including but not limited to support vector machines, Gaussian process regression systems.

Figure 1:
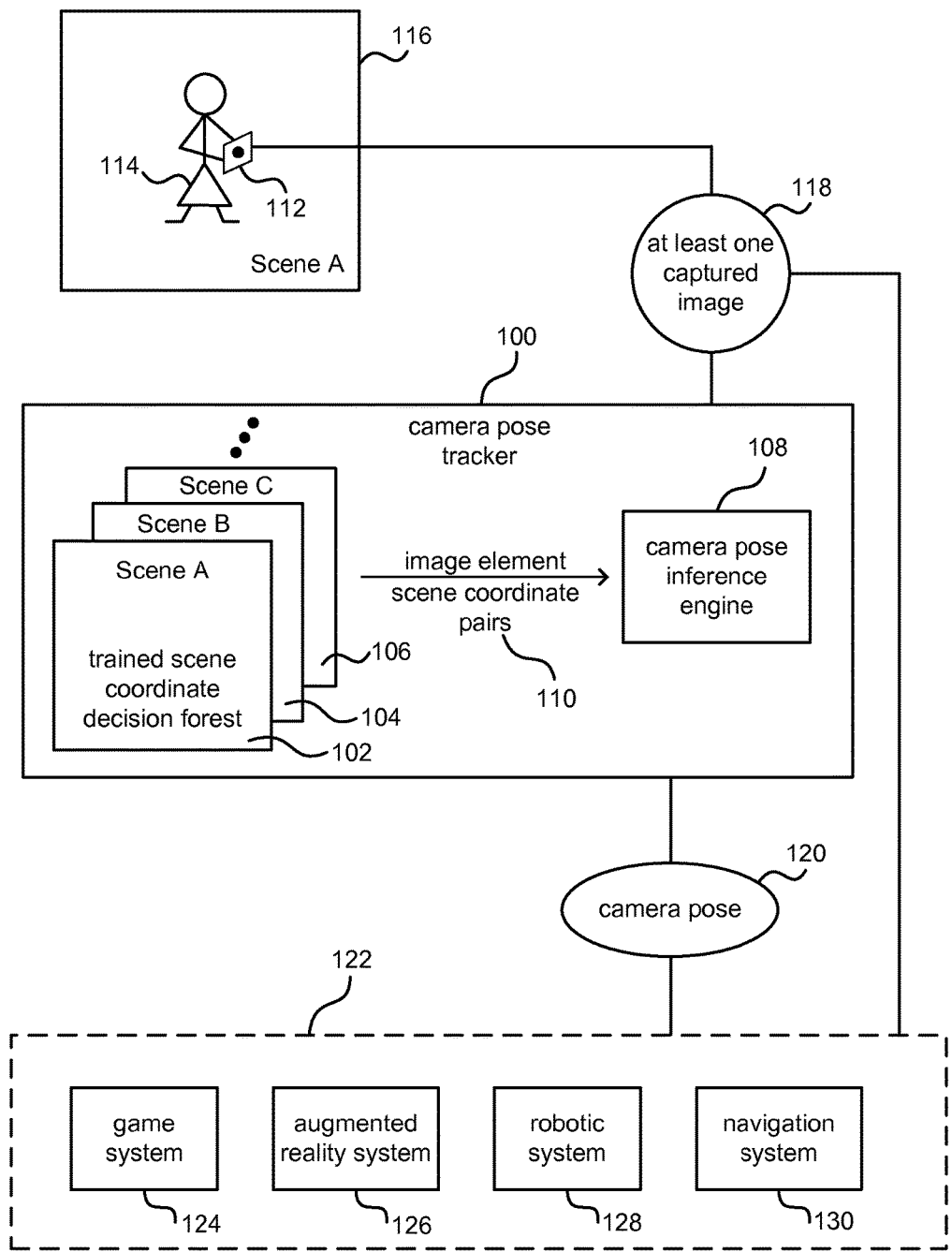
FIG. 1 is a schematic diagram of a camera pose tracker for relocalizing a mobile camera (such as in a smart phone) in scene A.

FIG. 1 is a schematic diagram of a camera pose tracker for relocalizing a mobile camera (such as in a smart phone) in scene A. In this example a person 114 is holding the mobile camera 112 which is integral with a communications device such as a smart phone. The person 114 uses the mobile camera 112 to capture at least one image 118 of scene A 116, such as a living room, office or other environment. The image may be a depth image, a color image (referred to as an RGB image) or may comprise both a depth image and a color image. In some examples a stream of images is captured by the mobile camera.

A camera pose tracker 100 is either integral with the smart phone or is provided at another entity in communication with the smart phone. The camera pose tracker 100 is implemented using software and/or hardware as described in more detail below with reference to FIG. 10. The camera pose tracker 100 comprises a plurality of trained scene coordinate decision forests 102, 104, 106 one for each of a plurality of scenes. The trained scene coordinate decision forests may be stored at the camera pose tracker or may be located at another entity which is in communication with the camera pose tracker. Each scene coordinate decision forest is a type of machine learning system which takes image elements (from images of its associated scene) as input and produces estimates of scene coordinates (in world space) of points in a scene which the image elements depict. Image elements may be pixels, groups of pixels, voxels, groups of voxels, blobs, patches or other components of an image. Other types of machine learning system may be used in place of the scene coordinate decision forest. For example, support vector machine regression systems, Gaussian process regression systems.

A decision forest comprises one or more decision trees each having a root node, a plurality of split nodes and a plurality of leaf nodes. Image elements of an image may be pushed through trees of a decision forest from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. The random decision forest may use regression or classification as described in more detail below. During training, parameter values (also referred to as features) are learnt for use at the split nodes and data is accumulated at the leaf nodes. For example, distributions of scene coordinates are accumulated at the leaf nodes.

Storing all the scene coordinates at the leaf nodes during training may be very memory intensive since large amounts of training data are typically used for practical applications. The scene coordinates may be aggregated in order that they may be stored in a compact manner. Various different aggregation processes may be used. An example in which modes of the distribution of scene coordinates are store is described in more detail below.

In the example of FIG. 1 there is a plurality of trained scene coordinate decision forests; one for each of a plurality of scenes. However, it is also possible to have a single trained scene coordinate decision forest which operates for a plurality of scenes. This is explained below with reference to FIG. 9.

The scene coordinate decision forest(s) provide image element-scene coordinate pair estimates 110 for input to a camera pose inference engine 108 in the camera pose tracker 100. Information about the certainty of the image element-scene coordinate estimates may also be available. The camera pose inference engine 108 may use an energy optimization approach to find a camera pose which is a good fit to a plurality of image element-scene coordinate pairs predicted by the scene coordinate decision forest. This is described in more detail below with reference to FIG. 8. In some examples scene coordinates for each available image element may be computed and used in the energy optimization. However, to achieve performance improvements whilst retaining accuracy, a subsample of image elements may be used to compute predicted scene coordinates.

The camera pose inference engine 108 uses many image element-scene coordinate pairs 110 to infer the pose of the mobile camera 112 using an energy optimization approach as mentioned above. Many more than three pairs (the minimum needed) may be used to improve accuracy. For example, the at least one captured image 118 may be noisy and may have missing image elements, especially where the captured image 118 is a depth image. On the other hand, to obtain a scene coordinate prediction for each image element in an image is computationally expensive and time consuming because each image element needs to be pushed through the forest as described with reference to FIG. 7. Therefore, in some examples, the camera pose inference engine may use an iterative process which gives the benefit that a subsample of image elements are used to compute scene coordinate predictions whilst taking accuracy into account.

The camera pose 120 output by the camera pose tracker may be in the form of a set of parameters with six degrees of freedom, three indicating the rotation of the camera and three indicating the position of the camera. For example, the output of the camera pose tracker is a set of registration parameters of a transform from camera space to world space. In some examples these registration parameters are provided as a six degree of freedom (6DOF) pose estimate in the form of an $SE_3$ matrix describing the rotation and translation of the camera relative to real-world coordinates.

The camera pose 120 output by the camera pose tracker 100 may be input to a downstream system 122 together with the captured image(s) 118. The downstream system may be a game system 124, an augmented reality system 126, a robotic system 128, a navigation system 130 or other system. An example where the downstream system 122 is an augmented reality system is described with reference to FIG. 2.

The examples described show how camera pose may be calculated. These examples may be modified in a straightforward manner to enable pose of an object to be calculated where the camera is fixed. In this case the machine learning system is trained using training images of an object where image elements are labeled with object coordinates. An object pose tracker is then provided which uses the methods described herein adapted to the situation where the camera is fixed and pose of an object is to be calculated.

Alternatively, or in addition, the camera pose tracker or object pose tracker described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 2:
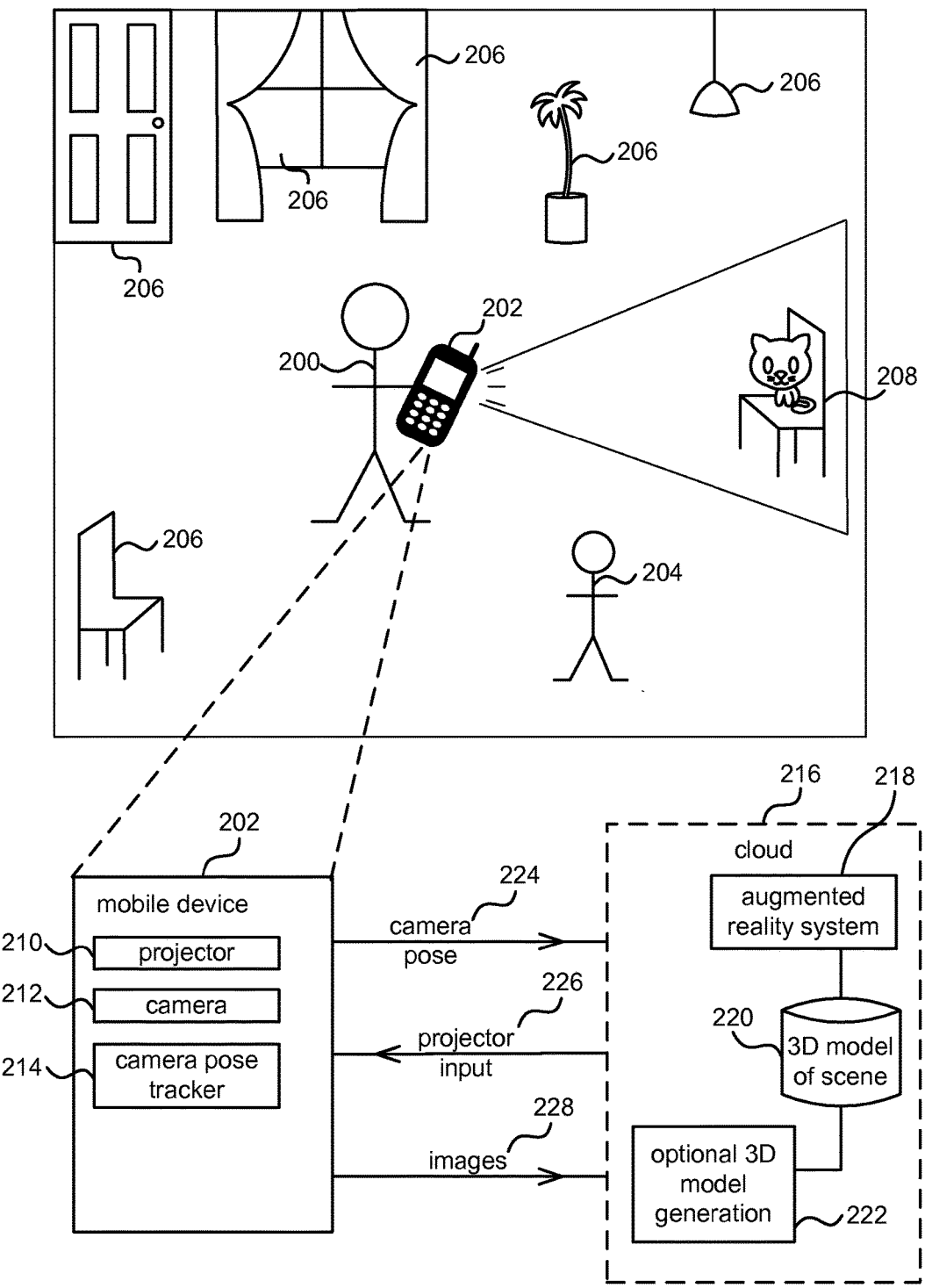
FIG. 2 is a schematic diagram of a person holding a mobile device with a camera and a camera pose tracker and which communicates with an augmented reality system to enable an image of a cat to be projected into the scene in a realistic manner.

FIG. 2 is a schematic diagram of a person 200 holding a mobile device 202 which has a camera 212, a camera pose tracker 214 and a projector 210. For example, the mobile device may be a smart phone. Other components of the mobile device to enable it to function as a smart phone such as a communications interface, display screen, power source and other components are not shown for clarity. A person 200 holding the mobile device 202 is able to capture images of the scene or environment in which the user is moving. In the example of FIG. 2 the scene or environment is a living room containing various objects 206 and another person 204.

The mobile device is able to communicate with one or more entities provided in the cloud 216 such as an augmented reality system 218, a 3D model of the scene 220 and an optional 3D model generation system 222.

For example, the user 200 operates the mobile device 202 to capture images of the scene which are used by the camera pose tracker 214 to compute the pose (position and orientation) of the camera. At the consent of the user, the camera pose is sent 224 to the entities in the cloud 216 optionally with the images 228. The augmented reality system 218 may have access to a 3D model of the scene 220 (for example, a 3D model of the living room) and may use the 3D model and the camera pose to calculate projector input 226. The projector input 226 is sent to the mobile device 202 and may be projected by the projector 210 into the scene. For example, an image of a cat 208 may be projected into the scene in a realistic manner taking into account the 3D model of the scene and the camera pose. The 3D model of the scene could be a computer aided design (CAD) model, or could be a model of the surfaces in the scene built up from images captured of the scene using a 3D model generation system 222. An example of a 3D model generation system which may be used is described in US patent application "Three-Dimensional Environment Reconstruction" Newcombe, Richard et al. published on Aug. 2, 2012 US20120194516. Other types of 3D model and 3D model generation systems may also be used.

Figure 3:
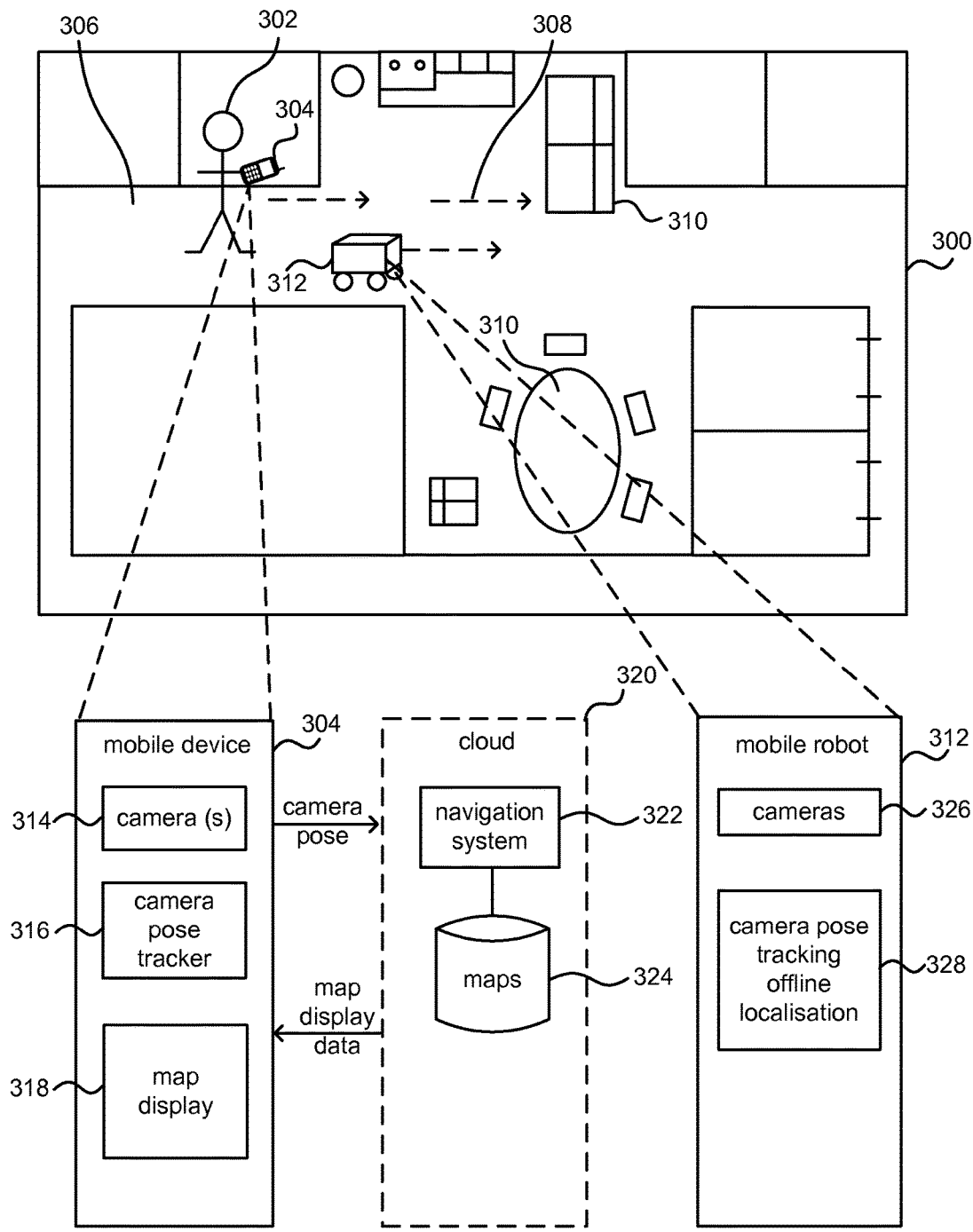
FIG. 3 is a schematic diagram of a person and a robot each with a camera and a camera pose tracker.

An example where the downstream system 122 is a navigation system is now described with reference to FIG. 3. FIG. 3 has a plan view of a floor of an office 300 with various objects 310. A person 302 holding a mobile device 304 is walking along a corridor 306 in the direction of arrows 308. The mobile device 304 has one or more cameras 314, a camera pose tracker 316 and a map display 318. The mobile device 304 may be a smart phone or other mobile communications device as described with reference to FIG. 2 and which is able to communicate with a navigation system 322 in the cloud 320. The navigation system 322 receives the camera pose from the mobile device (where the user has consented to the disclosure of this information) and uses that information together with maps 324 of the floor of the office to calculate map display data to aid the person 302 in navigating the office floor. The map display data is sent to the mobile device and may be displayed at map display 318.

An example where the downstream system 122 is a robotic system is now described with reference to FIG. 3. A robot vehicle 312 moves along the corridor 306 and captures images using one or more cameras 326 on the robot vehicle. A camera pose tracker 328 at the robot vehicle is able to calculate pose of the camera(s) where the scene is already known to the robot vehicle.

Figure 4:
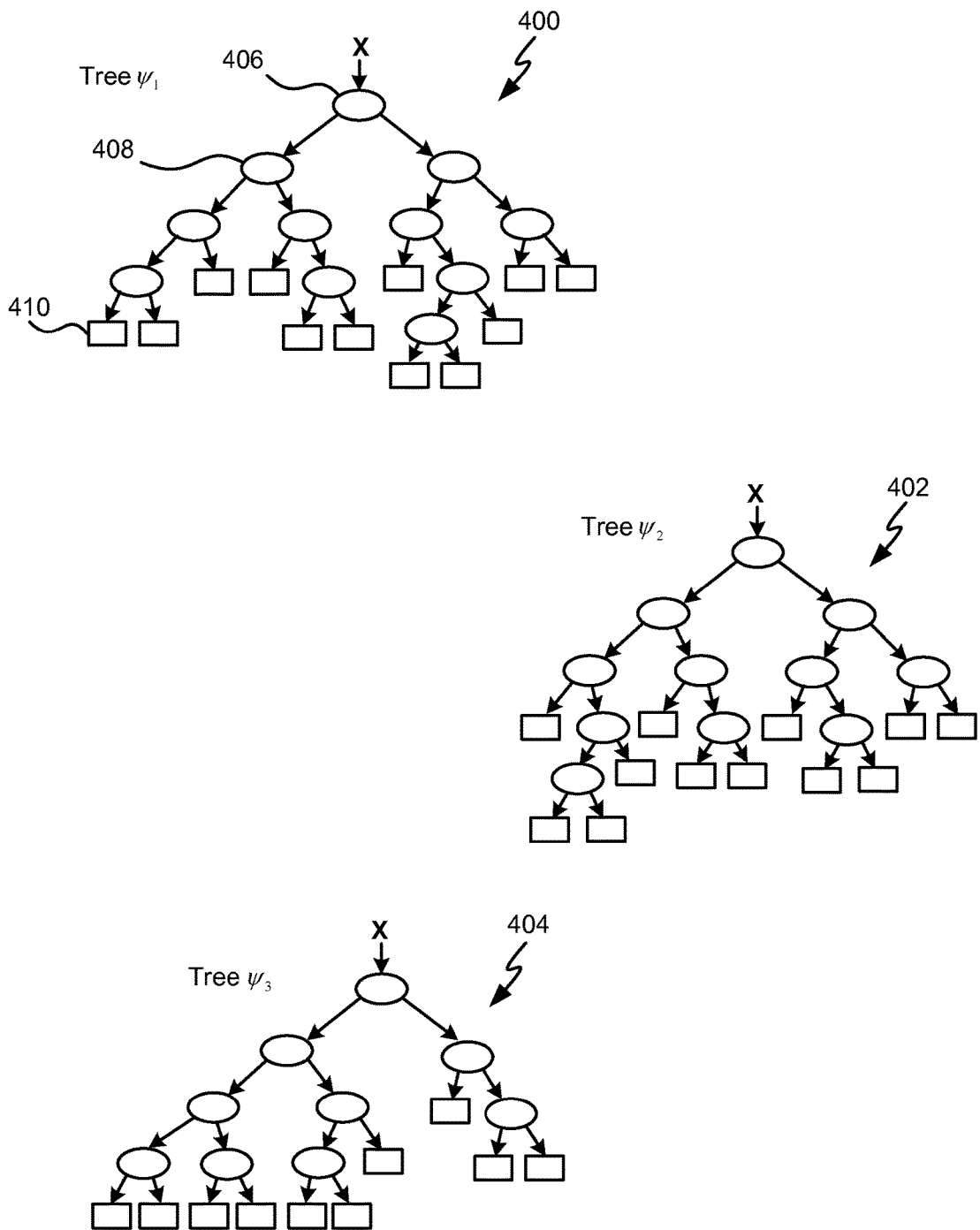
FIG. 4 is a schematic diagram of three random decision trees forming at least part of a random decision forest.

FIG. 4 is a schematic diagram of an example decision forest comprising three decision trees: a first tree 400 (denoted tree $\Psi_1$); a second tree 402 (denoted tree $\Psi_2$); and a third tree 404 (denoted tree $\Psi_3$). Each decision tree comprises a root node (e.g. root node 406 of the first decision tree 700), a plurality of internal nodes, called split nodes (e.g. split node 408 of the first decision tree 400), and a plurality of leaf nodes (e.g. leaf node 410 of the first decision tree 400).

In operation, each root and split node of each tree performs a binary test (or possibly an n-ary test) on the input data and based on the result directs the data to the left or right child node. The leaf nodes do not perform any action; they store accumulated scene coordinates (and optionally other information). For example, probability distributions may be stored representing the accumulated scene coordinates.

Figure 5:
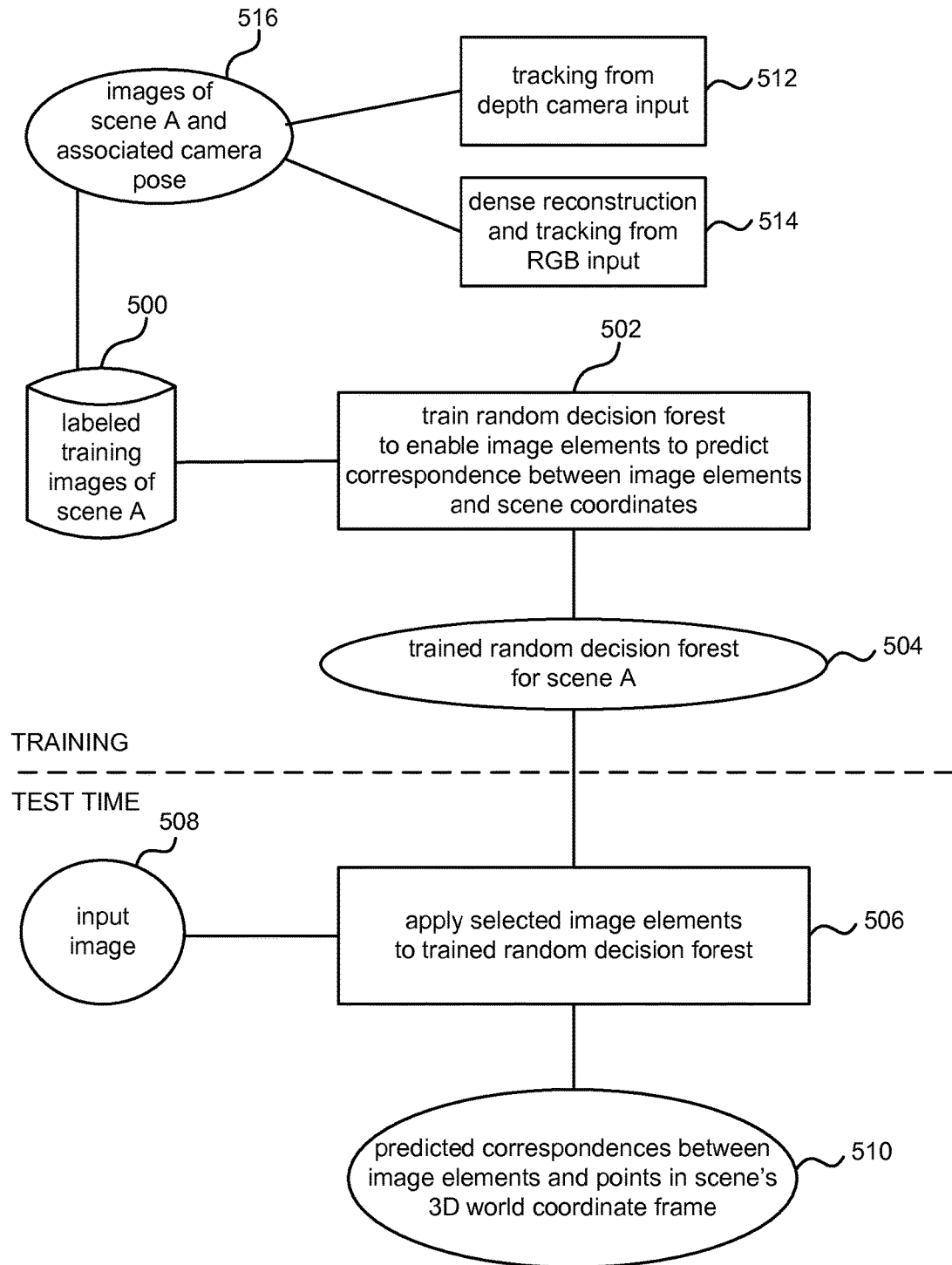
FIG. 5 is a flow diagram of a method of training a random decision forest to predict correspondences between image elements and scene coordinates; and using the trained random decision forest.

FIG. 5 is a flow diagram of a method of training a random decision forest to predict correspondences between image elements and scene coordinates. This is illustrated in the upper part of FIG. 5 above the dotted line in the region labeled "training". The lower part of FIG. 5 below the dotted line shows method steps at test time when the trained random decision forest is used to predict (or estimate) correspondences between image elements from an image of a scene and points in the scene's 3D world coordinate frame (scene coordinates).

A random decision forest is trained 502 to enable image elements to generate predictions of correspondences between themselves and scene coordinates. During training, labeled training images 500 of at least one scene, such as scene A, are used. For example, a labeled training image comprises, for each image element, a point in a scene's 3D world coordinate frame which the image element depicts. To obtain the labeled training images various different methods may be used to capture images 516 of scene A and record or calculate the pose of the camera for each captured image. Using this data a scene coordinate may be calculated indicating the world point depicted by an image element. To capture the images and record or calculate the associated camera pose, one approach is to carry out camera tracking from depth camera input 512. For example as described in US patent application "Real-time camera tracking using depth maps" Newcombe, Richard et al. published on Aug. 2, 2012 US20120196679. Another approach is to carry out dense reconstruction and camera tracking from RGB camera input 514. It is also possible to use a CAD model to generate synthetic training data. The training images themselves (i.e. not the label images) may be real or synthetic.

An example of the training process of box 502 is described below with reference to FIG. 6. The result of training is a trained random decision forest 504 for scene A (in the case where the training images were of scene A).

At test time an input image 508 of scene A is received and a plurality of image elements are selected from the input image. The image elements may be selected at random or in another manner (for example, by selecting such that spurious or noisy image elements are omitted). Each selected image element may be applied 506 to the trained decision forest to obtain predicted correspondences 510 between those image elements and points in the scene's 3D world coordinate frame.

Figure 6:
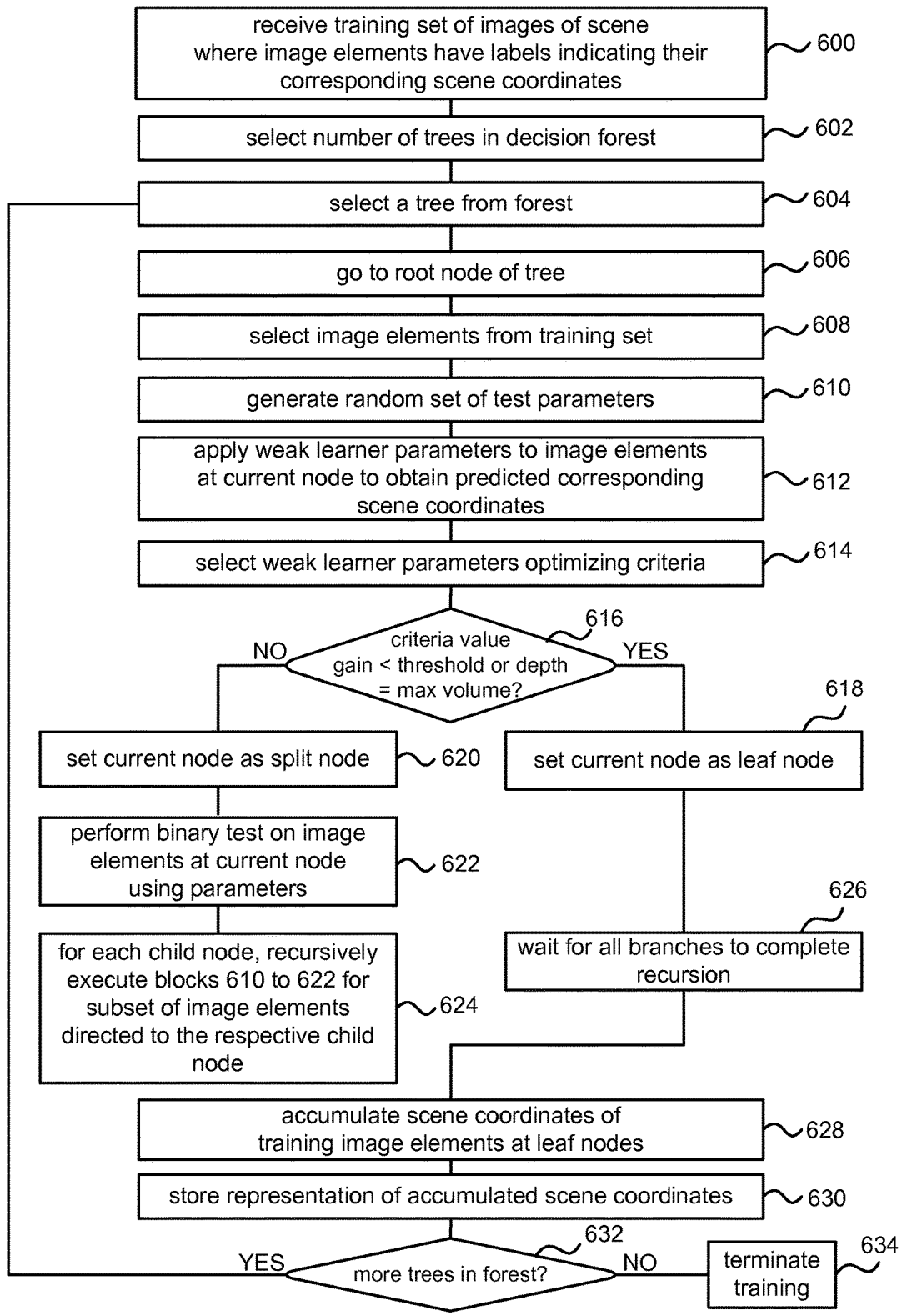
FIG. 6 is a flow diagram of a method of training a random decision forest using images of a scene where image elements have labels indicating their corresponding scene coordinates.

FIG. 6 is a flow diagram of a method of training a random decision forest using images of a scene where image elements have labels indicating their corresponding scene coordinates. A training set of images of a scene is received 600 where the image elements have labels indicating the scene coordinate of the scene point they depict. A number of trees to be used in the decision forest is selected 602, for example, between 3 and 20 trees.

A decision tree from the decision forest is selected 604 (e.g. the first decision tree 600) and the root node 606 is selected 606. At least a subset of the image elements from each of the training images are then selected 608. For example, the image may be filtered to remove noisy or spurious image elements.

A random set of test parameters (also called weak learners) are then generated 610 for use by the binary test performed at the root node as candidate features. In one example, the binary test is of the form: $\xi > f(x;\theta) > \tau$, such that $f(x;\theta)$ is a function applied to image element x with parameters $\theta$, and with the output of the function compared to threshold values $\xi$ and $\tau$. If the result of $f(x;\theta)$ is in the range between $\xi$ and $\tau$ then the result of the binary test is true. Otherwise, the result of the binary test is false. In other examples, only one of the threshold values $\xi$ and $\tau$ can be used, such that the result of the binary test is true if the result of ƒ(x;θ) is greater than (or alternatively less than) a threshold value. In the example described here, the parameter θ defines a feature of the image.

A candidate function ƒ(x;θ) makes use of image information which is available at test time. The parameter θ for the function ƒ(x;θ) is randomly generated during training. The process for generating the parameter θ can comprise generating random spatial offset values in the form of a two or three dimensional displacement. The result of the function ƒ(x;θ) is then computed by observing the depth (or intensity value in the case of an RGB image and depth image pair) value for one or more test image elements which are displaced from the image element of interest x in the image by spatial offsets. The spatial offsets are optionally made depth invariant by scaling by 1/depth of the image element of interest. Where RGB images are used without depth images the result of the function ƒ(x;θ) may be computed by observing the intensity value in a specified one of the red, green or blue color channel for one or more test image elements which are displaced from the image element of interest x in the image by spatial offsets.

The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter θ and the threshold values ξ and τ. In order to inject randomness into the decision trees, the function parameters θ of each split node are optimized only over a randomly sampled subset Θ of all possible parameters. This is an effective and simple way of injecting randomness into the trees, and increases generalization.

Then, every combination of test parameter may be applied 612 to each image element in the set of training images. In other words, available values for θ (i.e. $\theta_i \in \Theta$) are tried one after the other, in combination with available values of ξ and τ for each image element in each training image. For each combination, criteria (also referred to as objectives) are calculated 614. The combination of parameters that optimize the criteria is selected 614 and stored at the current node for future use.

In an example the objective is a reduction-in-variance objective expressed as follows:

$$Q(S_n, \theta) = V(S_n) - \sum_{d \in \{L,R\}} \frac{|S_n^{d(\theta)}|}{|S_n|} V(S_n^d(\theta))$$

Which may be expressed in words as the reduction in variance of the training examples at split node n, with weak learner parameters θ equal to the variance of all the training examples which reach that split node minus the sum of the variances of the training examples which reach the left and right child nodes of the split node. The variance may be calculated as:

$$V(S) = \frac{1}{|S|} \sum_{(p,m) \in S} \|m - \bar{m}\|_2^2$$

Which may be expressed in words as, the variance of a set of training examples S equals the average of the differences between the scene coordinates m and the mean of the scene coordinates in S.

As an alternative to a reduction-in-variance objective, other criteria can be used, such as logarithm of the determinant, or the continuous information gain.

It is then determined 616 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 618 as a leaf node. Similarly, the current depth of the tree is determined (i.e. how many levels of nodes are between the root node and the current node). If this is greater than a predefined maximum value, then the current node is set 618 as a leaf node. Each leaf node has scene coordinate predictions which accumulate at that leaf node during the training process as described below.

It is also possible to use another stopping criterion in combination with those already mentioned. For example, to assess the number of example image elements that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 620 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 622 on all image elements at the current node. The image elements that pass the binary test form a first subset sent to a first child node, and the image elements that fail the binary test form a second subset sent to a second child node.

For each of the child nodes, the process as outlined in blocks 610 to 622 of FIG. 6 are recursively executed 624 for the subset of image elements directed to the respective child node. In other words, for each child node, new random test parameters are generated 610, applied 612 to the respective subset of image elements, parameters optimizing the criteria selected 614, and the type of node (split or leaf) determined 616. If it is a leaf node, then the current branch of recursion ceases. If it is a split node, binary tests are performed 622 to determine further subsets of image elements and another branch of recursion starts. Therefore, this process recursively moves through the tree, training each node until leaf nodes are reached at each branch. As leaf nodes are reached, the process waits 626 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then scene coordinates may be accumulated 628 at the leaf nodes of the tree. This is the training stage and so particular image elements which reach a given leaf node have specified scene coordinates known from the ground truth training data. A representation of the scene coordinates may be stored 630 using various different methods. For example by aggregating the scene coordinates or storing statistics representing the distribution of scene coordinates.

In some embodiments a multi-modal distribution is fitted to the accumulated scene coordinates. Examples of fitting a multi-model distribution include using expectation maximization (such as fitting a Gaussian mixture model); using mean shift mode detection; using any suitable clustering process such as k-means clustering, agglomerative clustering or other clustering processes. Characteristics of the clusters or multi-modal distributions are then stored rather than storing the individual scene coordinates. In some examples a handful of the samples of the individual scene coordinates may be stored.

A weight may also be stored for each cluster or mode. For example, a mean shift mode detection algorithm is used and the number of scene coordinates that reached a particular mode may be used as a weight for that mode. Mean shift mode detection is an algorithm that efficiently detects the modes (peaks) in a distribution defined by a Parzen window density estimator. In another example, the density as defined by a Parzen window density estimator may be used as a weight. A Parzen window density estimator (also known as a kernel density estimator) is a non-parametric process for estimating a probability density function, in this case of the accumulated scene coordinates. A Parzen window density estimator takes a bandwidth parameter which can be thought of as controlling a degree of smoothing.

In an example a sub-sample of the training image elements that reach a leaf are taken and input to a mean shift mode detection process. This clusters the scene coordinates into a small set of modes. One or more of these modes may be stored for example, according to the number of examples assigned to each mode.

Once the accumulated scene coordinates have been stored it is determined 632 whether more trees are present in the decision forest. If so, then the next tree in the decision forest is selected, and the process repeats. If all the trees in the forest have been trained, and no others remain, then the training process is complete and the process terminates 634.

Therefore, as a result of the training process, one or more decision trees are trained using empirical training images. Each tree comprises a plurality of split nodes storing optimized test parameters, and leaf nodes storing associated scene coordinates or representations of aggregated scene coordinates. Due to the random generation of parameters from a limited subset used at each node, and the possible subsampled set of training data used in each tree, the trees of the forest are distinct (i.e. different) from each other.

The training process may be performed in advance of using the trained prediction system to identify scene coordinates for image elements of depth or RGB images of one or more known scenes. The decision forest and the optimized test parameters may be stored on a storage device for use in identifying scene coordinates of image elements at a later time.

Figure 7:
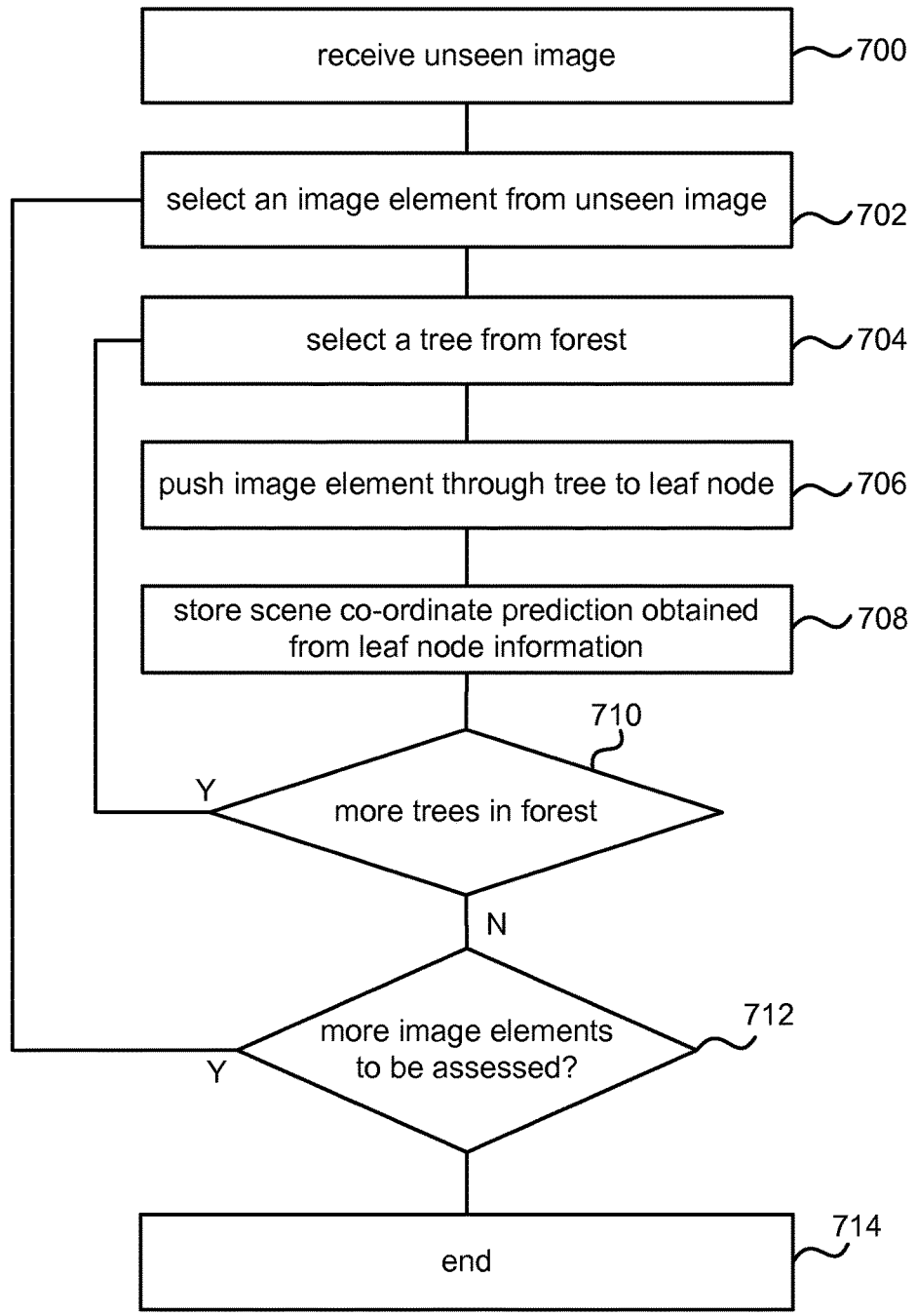
FIG. 7 is a flow diagram of a method of using a trained random decision forest to obtain scene coordinate—image element pairs.

FIG. 7 illustrates a flowchart of a process for predicting scene coordinates in a previously unseen image (a depth image, an RGB image, or a pair of rectified depth and RGB images) using a decision forest that has been trained as described with reference to FIG. 6. Firstly, an unseen image is received 700. An image is referred to as 'unseen' to distinguish it from a training image which has the scene coordinates already specified.

An image element from the unseen image is selected 702. A trained decision tree from the decision forest is also selected 704. The selected image element is pushed 706 through the selected decision tree, such that it is tested against the trained parameters at a node, and then passed to the appropriate child in dependence on the outcome of the test, and the process repeated until the image element reaches a leaf node. Once the image element reaches a leaf node, the accumulated scene coordinates (from the training stage) associated with this leaf node are stored 708 for this image element. In an example where the leaf node stores one or more modes of a distribution of scene coordinates, one or more of those modes are stored for this image element.

If it is determined 710 that there are more decision trees in the forest, then a new decision tree is selected 704, the image element pushed 706 through the tree and the accumulated scene coordinates stored 708. This is repeated until it has been performed for all the decision trees in the forest. The final prediction of the forest for an image element may be an aggregate of the scene coordinates obtained from the leaf found at each tree. Where one or more modes of a distribution of scene coordinates are stored at the leaves, the final prediction of the forest may be a union of the modes from the leaf found at each tree. Note that the process for pushing an image element through the plurality of trees in the decision forest can also be performed in parallel, instead of in sequence as shown in FIG. 7.

It is then determined 712 whether further unanalyzed image elements are to be assessed, and if so another image element is selected and the process repeated. The camera pose inference engine may be arranged to determine whether further unanalyzed image elements are to be assessed as described below with reference to FIG. 8.

Figure 8:
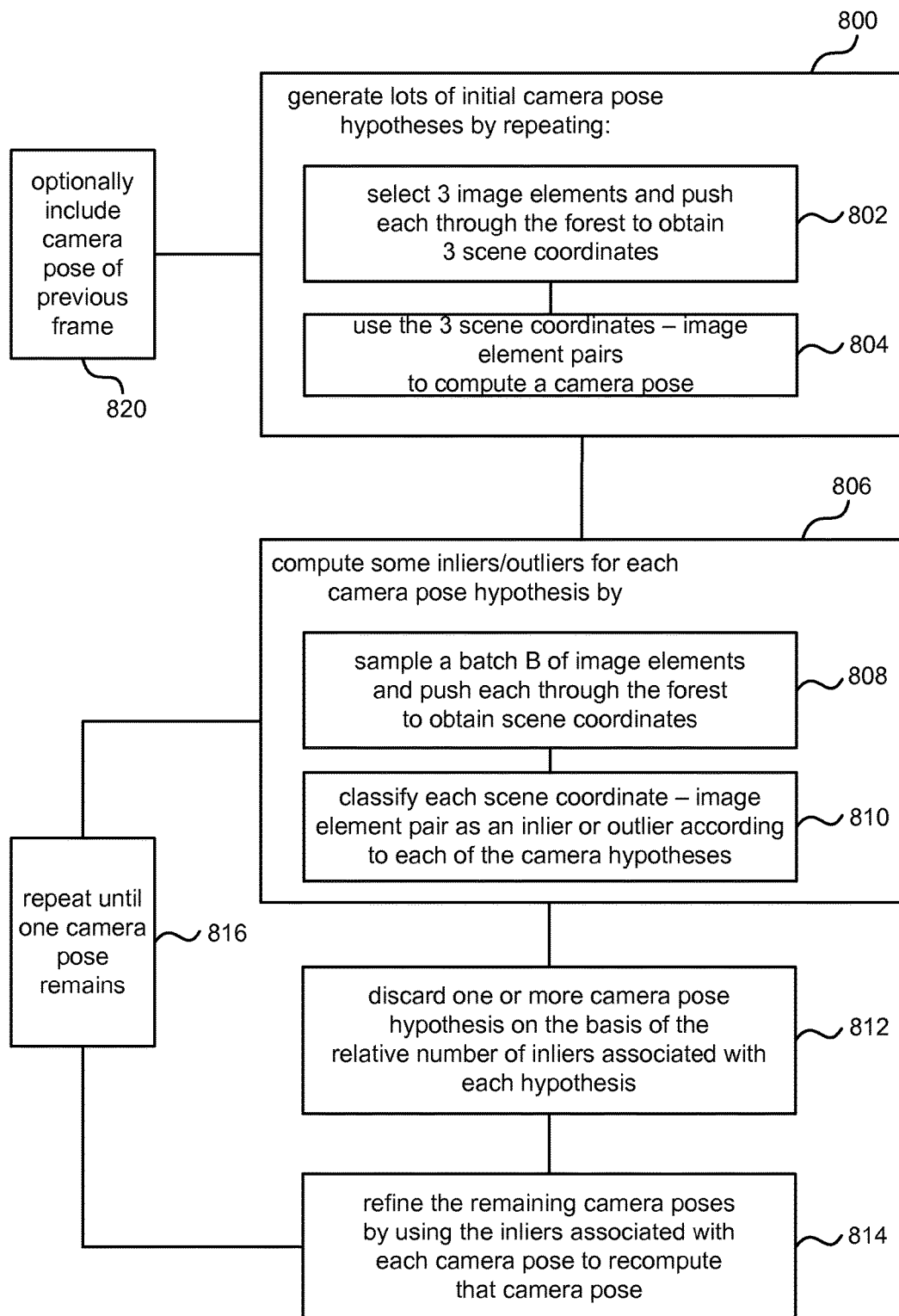
FIG. 8 is a flow diagram of a method at a camera pose inference engine of using scene-coordinate-image element pairs to infer camera pose.

FIG. 8 is a flow diagram of a method at a camera pose inference engine of using scene-coordinate-image element pairs to infer camera pose. As mentioned above the camera pose inference engine may use an energy optimization approach to find a camera pose which is a good fit to a plurality of image element-scene coordinate pairs predicted by the scene coordinate decision forest. In the case that depth images, or both depth and RGB images are used, an example energy function may be:

$$E(H) = \Sigma_{i \in I} \rho(\min_{m \in M_i} \|m - Hx_i\|_2) = \Sigma_{i \in I} e_i(H)$$

Where $i \in I$ is an image element index; $\rho$ is a robust error function; $m \in M_i$ represents the set of modes (3D locations in the scene's world space) predicted by the trees in the forest at image element $p_i$; and $x_i$ are the 3D coordinates in camera space corresponding to pixel $p_i$ which may be obtained by back-projecting the depth image elements. The energy function may be considered as counting the number of outliers for a given camera hypothesis H. The above notation uses homogeneous 3D coordinates.

In the case that RGB images are used without depth images the energy function may be modified by $$E(H) = E_{i \in I} \rho(\min_{m \in M_i} \|\pi(KH^{-1}m - p_i)\|_2) = \Sigma_{i \in I} e_i(H)$$

where $\rho$ is a robust error function, $\pi$ projects from 3D to 2D image coordinates, K is a matrix that encodes the camera intrinsic parameters, and $p_i$ is the 2D image element coordinate.

Note that E, $\rho$ and $e_i$ may be separated out with different superscripts such as rgb/depth in the above equations.

In order to optimize the energy function an iterative process may be used to search for good camera pose candidates amongst a set of possible camera pose candidates. Samples of image element-scene coordinate pairs are taken and used to assess the camera pose candidates. The camera pose candidates may be refined or updated using a subset of the image element-scene coordinate pairs. By using samples of image element-scene coordinate pairs rather than each image element-scene coordinate pair from an image computation time is reduced without loss of accuracy.

An example iterative process which may be used at the camera pose inference engine is now described with reference to FIG. 8. A set of initial camera pose candidates or hypotheses is generated 800 by, for each camera pose candidate, selecting 802 three image elements from the input image (which may be a depth image, an RGB image or a pair of rectified depth and RGB images). The selection may be random or may take into account noise or missing values in the input image. It is also possible to pick pairs where the scene coordinate is more certain where certainty information is available from the forest. In some examples a minimum distance separation between the image elements may be enforced in order to improve accuracy. Each image element is pushed through the trained scene coordinate decision forest to obtain three scene coordinates. The three image element-scene coordinate pairs are used to compute 804 a camera pose using any suitable method such as the Kabsch algorithm also known as orthogonal Procrustes alignment which uses a singular value decomposition to compute the camera pose hypothesis. In some examples the set of initial camera pose candidates may include 820 one or more camera poses of previous frames where a stream of images is available. It may also include a camera pose predicted from knowledge of the camera's path.

For each camera pose hypothesis some inliers or outliers are computed 806. Inliers and outliers are image element-scene coordinate pairs which are classified as either being consistent with a camera pose hypothesis or not. To compute inliers and outliers a batch B of image elements is sampled 808 from the input image and applied to the trained forest to obtain scene coordinates. The sampling may be random or may take into account noise or missing values in the input image. Each scene coordinate-image element pair may be classified 810 as an inlier or an outlier according to each of the camera pose hypotheses. For example, by comparing what the forest says the scene coordinate is for the image element and what the camera pose hypothesis says the scene coordinate is for the image element.

Optionally, one or more of the camera pose hypotheses may be discarded 812 on the basis of the relative number of inliers (or outliers) associated with each hypothesis, or on the basis of a rank ordering by outlier count with the other hypotheses. In various examples the ranking or selecting hypotheses may be achieved by counting how many outliers each camera pose hypothesis has. Camera pose hypotheses with fewer outliers have a higher energy according to the energy function above.

Optionally, the remaining camera pose hypotheses may be refined 814 by using the inliers associated with each camera pose to recompute that camera pose (using the Kabsch algorithm mentioned above). For efficiency the process may store and update the means and covariance matrices used by the singular value decomposition.

The process may repeat 816 by sampling another batch B of image elements and so on until one or a specified number of camera poses remains or according to other criteria (such as the number of iterations).

The camera pose inference engine is able to produce an accurate camera pose estimate at interactive rates. This is achieved without an explicit 3D model of the scene having to be computed. A 3D model of the scene can be thought of as implicitly encoded in the trained random decision forest.

Because the forest has been trained to work at any valid image element it is possible to sample image elements at test time. The sampling avoids the need to compute interest points and the expense of densely evaluation the forest.

Figure 9:
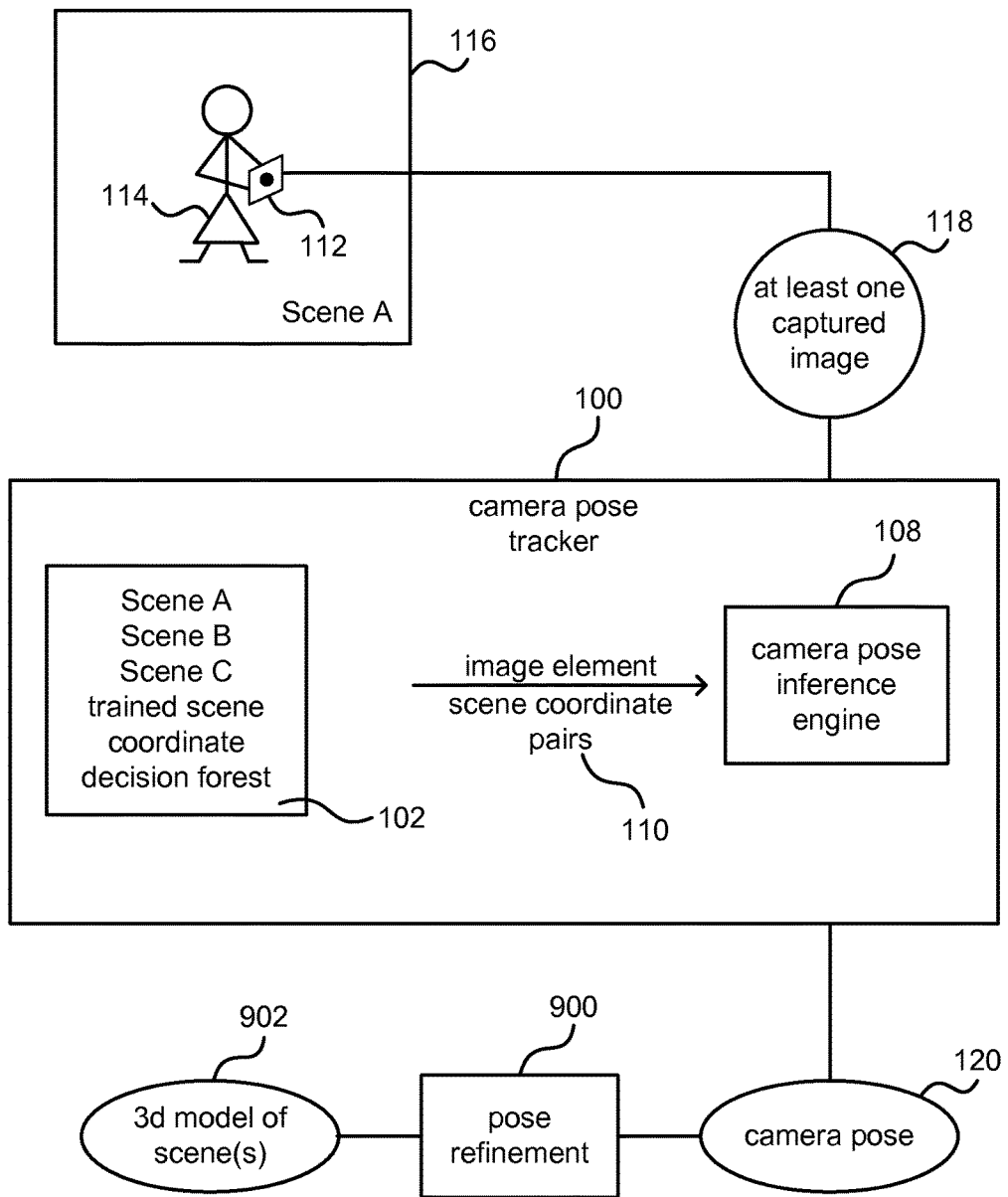
FIG. 9 is a schematic diagram of the camera pose tracker of FIG. 1 where a 3D model of the scene is available.

FIG. 9 is a schematic diagram of the camera pose tracker of FIG. 1 where a 3D model 902 of the scene is available. For example the 3D model may be a CAD model or may be a dense reconstruction of the scene built up from depth images of the scene as described in US patent application "Three-dimensional environment reconstruction" Newcombe, Richard et al. published on Aug. 2, 2012 US20120194516. A pose refinement process 900 may be carried out to improve the accuracy of the camera pose 120. The pose refinement process 900 may be an iterative closest point pose refinement as described in US patent application "Real-time camera tracking using depth maps" Newcombe, Richard et al. published on Aug. 2, 2012 US20120196679. In another example the pose refinement process 900 may seek to align depth observations from the mobile camera with surfaces of the 3D model of the scene in order to find an updated position and orientation of the camera which facilitates the alignment. This is described in U.S. patent application Ser. No. 13/749,497 filed on 24 Jan. 2013 entitled "Camera pose estimation for 3D reconstruction" Sharp et al.

The example shown in FIG. 9 has a camera pose tracker with one trained random decision forest rather than a plurality of trained random decision forests as in FIG. 1. This is intended to illustrate that a single forest may encapsulate a plurality of scenes by training the single forest using training data from those scenes. The training data comprises scene coordinates for image elements and also labels for image elements which identify a particular scene. Each sub-scene may be given a 3D sub-region of the full 3D world coordinate space and the forest may then be trained as described above. The camera pose tracker output may comprise an estimated camera pose and a scene so that the camera pose tracker is also able to carry out scene recognition. This enables the camera pose tracker to send data to a downstream system identifying which of a plurality of possible scenes the camera is in.

Figure 10:
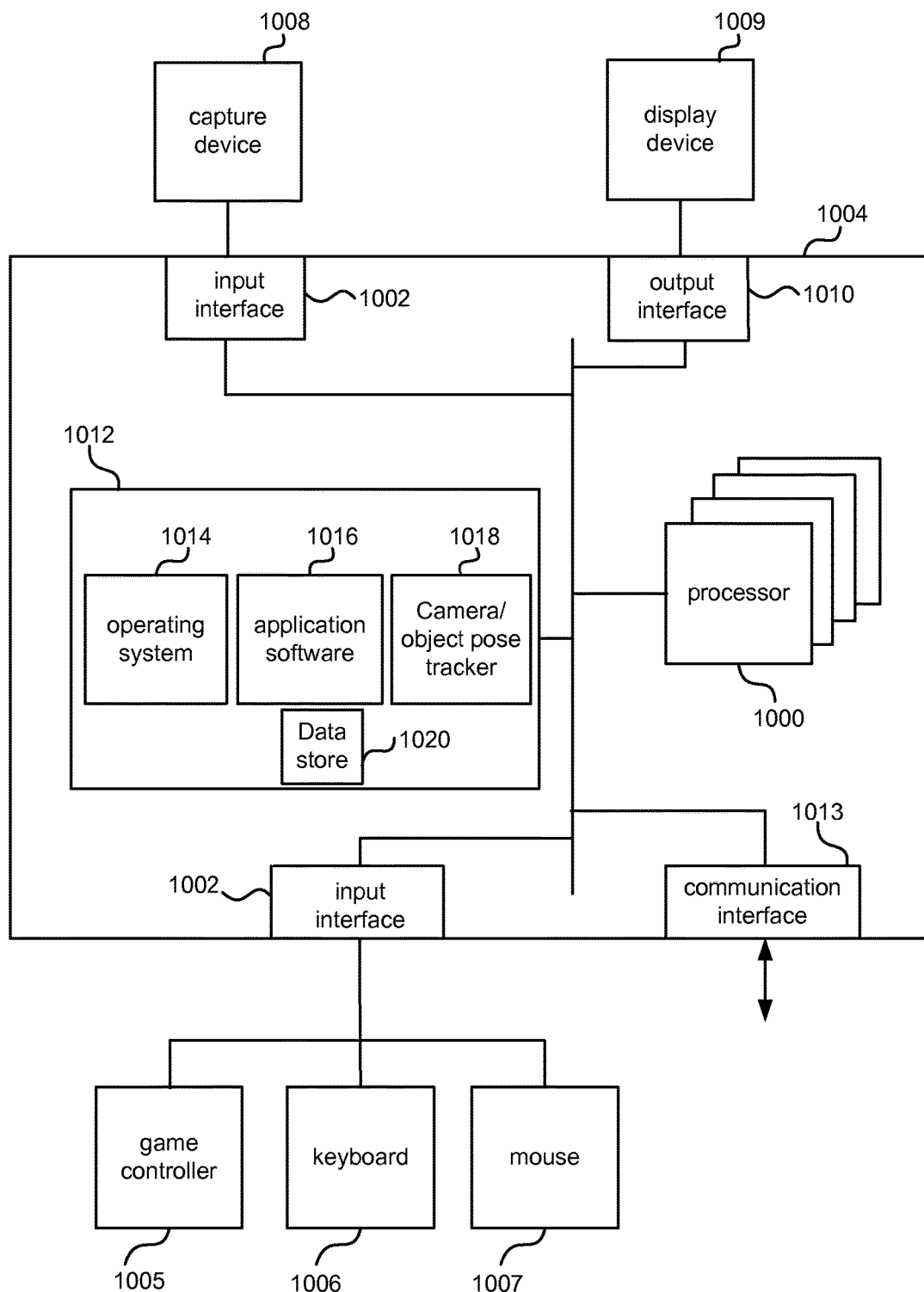
FIG. 10 illustrates an exemplary computing-based device in which embodiments of a camera or object pose tracker may be implemented.

FIG. 10 illustrates various components of an exemplary computing-based device 1004 which may be implemented as any form of a computing and/or electronic device, and in which embodiments of a camera pose tracker or object pose tracker may be implemented.

The computing-based device 1004 comprises one or more input interfaces 1002 arranged to receive and process input from one or more devices, such as user input devices (e.g. capture device 1008, a game controller 1005, a keyboard 1006, a mouse 1007). This user input may be used to control software applications, camera pose tracking or object pose tracking. For example, capture device 1008 may be a mobile depth camera arranged to capture depth maps of a scene. It may also be a fixed depth camera arranged to capture depth maps of an object. In another example, capture device 1008 comprises both a depth camera and an RGB camera. The computing-based device 1004 may be arranged to provide camera or object pose tracking at interactive rates.

The computing-based device 1004 also comprises an output interface 1010 arranged to output display information to a display device 1009 which can be separate from or integral to the computing device 1004. The display information may provide a graphical user interface. In an example, the display device 1009 may also act as the user input device if it is a touch sensitive display device. The output interface 1010 may also output date to devices other than the display device, e.g. a locally connected printing device.

In some examples the user input devices 1005, 1007, 1008, 1009 may detect voice input, user gestures or other user actions and may provide a natural user interface (NUI). This user input may be used to control a game or other application. The output interface 1010 may also output data to devices other than the display device, e.g. a locally connected printing device.

The input interface 1002, output interface 1010, display device 1009 and optionally the user input devices 1005, 1007, 1008, 1009 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

Computer executable instructions may be provided using any computer-readable media that is accessible by computing based device 1004. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1004 it will be appreciated that the storage may be distributed or located remotely and accessed via a network or other communication link (e.g. using communication interface 1013).

Computing-based device 1004 also comprises one or more processors 1000 which may be microprocessors, controllers or any other suitable type of processors for processing computing executable instructions to control the operation of the device in order to provide real-time camera tracking. In some examples, for example where a system on a chip architecture is used, the processors 1000 may include one or more fixed function blocks (also referred to as accelerators) which implement a part of the method of real-time camera tracking in hardware (rather than software or firmware).

Platform software comprising an operating system 1014 or any other suitable platform software may be provided at the computing-based device to enable application software 1016 to be executed on the device. Other software than may be executed on the computing device 1004 comprises: camera/object pose tracker 1018 which comprises a pose inference engine. A trained support vector machine regression system may also be provided and/or a trained Gaussian process regression system. A data store 1020 is provided to store data such as previously received images, camera pose estimates, object pose estimates, trained random decision forests registration parameters, user configurable parameters, other parameters, 3D models of scenes, game state information, game metadata, map data and other data.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of calculating pose of an entity comprising:
receiving, at a processor, at least one image where the image is of a scene captured by an entity comprising a mobile camera;
applying image elements of the at least one image to a trained machine learning system to obtain a plurality of associations between image elements and three-dimensional (3D) points in a scene space, the trained machine learning system optimizing an energy function comprising the 3D points in the scene space predicted by at least one tree in at least one random decision forest and 3D coordinates in camera space;
determining whether a pose of the entity has been calculated;
based on a determination that the pose has been calculated, refining the pose of the entity from the plurality of associations and the optimized function; and
based on a determination that the pose of the entity has not been calculated, calculating an initial pose of the entity from the plurality of associations and the optimized function; and
generating map display data based at least in part on the initial pose of the entity, wherein the energy function comprises:

$$E(H)=\Sigma_{i \in 1}\rho(\min_{m \in M_i}\|m-Hx_i\|_2)$$

wherein id is an index of the image elements, $\rho$ is an error function, $m \in M_i$ represents the predicted 3D points in the scene space, $x_i$ are the 3D coordinates in the camera space, and H is the pose of the entity.

2. A method as claimed in claim 1, further comprising calculating the initial pose of the entity as parameters having six degrees of freedom, three indicating rotation of the entity and three indicating position of the entity.

3. A method as claimed in claim 1, the machine learning system having been trained using images with image elements labeled with scene coordinates.

4. A method as claimed in claim 1, wherein the machine learning system comprises a plurality of trained random forests and the method further comprises:
applying the image elements of the at least one image to the plurality of trained random forests, the trained random forests having been trained using images from a different one of a plurality of scenes; and
calculating which of the scenes the mobile camera was in when the at least one image was captured.

5. A method as claimed in claim 1, wherein the machine learning system is trained using images of a plurality of scenes with image elements labeled with scene identifiers and labeled with scene coordinates of points in the scene the image elements depict.

6. A method as claimed in claim 1, further comprising calculating the pose by searching amongst a set of possible pose candidates and using samples of the plurality of associations between image elements and points to assess the set of possible pose candidates.

7. A method as claimed in claim 1, further comprising receiving at the processor, a stream of images, and calculating the pose by searching amongst a set of possible pose candidates which includes a second pose calculated from another image in the stream.

8. A method as claimed in claim 1 at least partially carried out using hardware logic selected from one or more of the following: a field-programmable gate array, a program-specific integrated circuit, a program-specific standard product, a system-on-a-chip, a complex programmable logic device, and a graphics processing unit.

9. A method as claimed in claim 1, wherein the entity is a mobile camera and the pose of the mobile camera is calculated, the method further comprising accessing a 3D model of the scene and refining the pose of the mobile camera using the accessed 3D model.

10. A pose tracker comprising:
a processor arranged to:
receive at least one image of a scene captured by an entity comprising a mobile camera; and
apply image elements of the at least one image to a trained machine learning system to obtain a plurality of associations between image elements and three-dimensional (3D) points in a scene space; and
a pose inference engine arranged to:
optimize an energy function comprising the 3D points in the scene space predicted by at least one tree in at least one random decision forest and 3D coordinates in camera space;
determine whether a pose of the entity has been calculated;

based on a determination that the pose has been calculated, refining the pose of the entity from the plurality of associations and the optimized function; and based on a determination that the pose of the entity has not been calculated, calculate an initial pose of the mobile camera from the plurality of associations, the calculation being based at least in part on the optimized function;

wherein the energy function comprises:

$$E(H)=\Sigma_{i\in 1}\rho(\min_{m\in M_i}\|m-Hx_i\|_2)$$

wherein i∈I is an index of the image elements, ρ is an error function, m∈$M_i$ represents the predicted 3D points in the scene space, $x_i$ are the 3D coordinates in the camera space, and H is the pose of the entity.

11. The pose tracker as claimed in claim 10, the pose inference engine further arranged to calculate the initial pose by searching amongst a set of possible pose candidates and using samples of the plurality of associations between image elements and points in scene coordinates to assess the set of possible pose candidates.

12. The pose tracker as claimed in claim 10, the processor further arranged to receive a stream of images, and the pose tracker further comprising a pose inference engine arranged to calculate the initial pose by searching amongst a set of possible pose candidates which includes a second pose calculated from another image in the stream of images.

13. The pose tracker as claimed in claim 10 at least partially implemented using hardware logic selected from one or more of the following: a field-programmable gate array, a program-specific integrated circuit, a program-specific standard product, a system-on-a-chip, a complex programmable logic device, and a graphics processing unit.

14. The method as claimed in claim 1, further comprising prior to applying the image elements, removing a set of image elements that are spurious or noisy image elements.

15. One or more computer-readable storage devices having computer-executable instructions that when executed by a processor, cause the processor to:

receive at least one image that is of a scene captured by an entity comprising a mobile camera;

apply image elements of the at least one image to a trained machine learning system to obtain a plurality of associations between a set of image elements and three dimensional (3D) points in a scene space, the trained machine learning system optimizing an energy function comprising the 3D points in the scene space predicted by at least one tree in at least one random decision forest and 3D coordinates in camera space;

determine whether a pose of the entity has been calculated;

based on a determination that the pose has been calculated, refine the pose of the entity from the plurality of associations and the optimized function;

based on a determination that the pose of the entity has not been calculated, calculate an initial pose of the entity from the plurality of associations and the optimized function; and generate map display data based at least in part on the initial pose of the entity;

wherein the energy function comprises:

$$E(H)=\Sigma_{i\in 1}\rho(\min_{m\in M_i}\|m-Hx_i\|_2)$$

wherein i∈I is an index of the image elements, ρ is an error function, m∈$M_i$ represents the predicted 3D points in the scene space, $x_i$ are the 3D coordinates in the camera space, and H is the pose of the entity.

16. The one or more computer-readable storage devices of claim 15, wherein applying the set of image elements comprises applying at least three image elements.

17. The method as claimed in claim 1, further comprising improving an accuracy of the calculated pose by enforcing a minimum distance separation between the image elements.

18. The method as claimed in claim 1, further comprising enabling a downstream system to use the initial pose of the entity to determine an updated pose of the entity or to use the initial pose of the entity in one or more other applications by providing the initial pose of the entity to the downstream system.

19. The method as claimed in claim 1, further comprising:
setting a threshold for refining the pose of the entity from the plurality of associations and the optimized function; and
stopping the refinement once the threshold has been reached.

20. The method as claimed in claim 7, further comprising:
sampling the set of possible pose candidates for noise or missing values; and
based on the sampling, determining whether a pose candidate is an inlier or outlier.

* * * * *